(12) United States Patent
Orazem

(10) Patent No.: US 9,981,597 B2
(45) Date of Patent: May 29, 2018

(54) METHOD AND APPARATUS FOR INSTALLING AND OPERATING AN AUXILIARY LIGHTING SYSTEM USING A VEHICLE ELECTRIC PLUG

(71) Applicant: Meyer Products LLC, Cleveland, OH (US)

(72) Inventor: Louis Orazem, Chardon, OH (US)

(73) Assignee: Meyer Products LLC, Cleveland, OH (US)

( * ) Notice: Subject to any disclaimer, the term of this patent is extended or adjusted under 35 U.S.C. 154(b) by 322 days.

(21) Appl. No.: 14/997,341

(22) Filed: Jan. 15, 2016

(65) Prior Publication Data

US 2016/0207447 A1 Jul. 21, 2016

Related U.S. Application Data

(60) Continuation-in-part of application No. 14/871,858, filed on Sep. 30, 2015, now Pat. No. 9,346,394, which
(Continued)

(51) Int. Cl.
| | |
|---|---|
| *B60Q 1/18* | (2006.01) |
| *B60Q 1/26* | (2006.01) |
| *B60Q 1/00* | (2006.01) |
| *B60Q 1/30* | (2006.01) |
| *B60Q 1/38* | (2006.01) |
| *H01R 31/06* | (2006.01) |
| *E01H 5/06* | (2006.01) |

(52) U.S. Cl.
CPC ......... *B60Q 1/2661* (2013.01); *B60Q 1/0035* (2013.01); *B60Q 1/0088* (2013.01); *B60Q 1/18* (2013.01); *B60Q 1/305* (2013.01); *B60Q 1/38* (2013.01); *H01R 31/06* (2013.01); *B60Q 2900/30* (2013.01); *E01H 5/06* (2013.01); *H01R 2201/26* (2013.01)

(58) Field of Classification Search
CPC ...... B60R 16/0207; B60Q 1/18; B60Q 1/305; B60Q 1/0088
USPC ........................................................ 307/10.8
See application file for complete search history.

(56) References Cited

U.S. PATENT DOCUMENTS 4,280,062 A   7/1981 Miller
4,781,393 A   11/1988 Jeter
(Continued)

FOREIGN PATENT DOCUMENTS

DE         29700668         3/1997

OTHER PUBLICATIONS

International Search Report and Written Opinion, PCT/US2016/013731, European Patent Office, dated May 6, 2016.

*Primary Examiner* — Fritz M Fleming
(74) *Attorney, Agent, or Firm* — Emerson Thomson Bennett, LLC; Roger D. Emerson

(57) ABSTRACT

An auxiliary apparatus may be used with a vehicle. The auxiliary apparatus may include an auxiliary implement, an auxiliary lighting system and auxiliary wiring. When the auxiliary wiring is properly connected: (1) an operator adjustable auxiliary implement control is operable to operate the auxiliary implement; (2) an operator adjustable auxiliary light control is operable to operate an auxiliary headlight; and, (3) an operator adjustable vehicle light control is operable to operate an auxiliary supplemental light.

20 Claims, 26 Drawing Sheets

Related U.S. Application Data is a continuation-in-part of application No. 14/809,390, filed on Jul. 27, 2015, now Pat. No. 9,278,645, which is a division of application No. 14/680,367, filed on Apr. 7, 2015, which is a continuation-in-part of application No. 14/622,211, filed on Feb. 13, 2015.

(60) Provisional application No. 62/104,570, filed on Jan. 16, 2015.

(56) References Cited

U.S. PATENT DOCUMENTS

| | | | |
|---|---|---|---|
| 5,420,480 A | 5/1995 | Knepel et al. | |
| 5,524,368 A | 6/1996 | Struck et al. | |
| 5,607,221 A | 3/1997 | Justus | |
| 5,769,526 A | 6/1998 | Shaffer | |
| 5,828,299 A | 10/1998 | Chen | |
| 5,841,203 A | 11/1998 | Chambers | |
| 5,904,261 A | 5/1999 | Belinky et al. | |
| 5,971,799 A | 10/1999 | Swade | |
| 6,005,300 A | 12/1999 | Kelly | |
| 6,112,139 A | 8/2000 | Schubert et al. | |
| 6,138,388 A | 10/2000 | Kost et al. | |
| 6,265,829 B1 | 7/2001 | Perdec | |
| 6,322,238 B1 | 11/2001 | Barr | |
| 6,362,727 B1 | 3/2002 | Guy, Jr. | |
| 6,396,210 B1 | 5/2002 | Menze | |
| 6,504,306 B2 | 1/2003 | Menze | |
| 6,700,310 B2 | 3/2004 | Maue et al. | |
| RE38,665 E | 12/2004 | Struck et al. | |
| 7,137,724 B2 | 11/2006 | Menze et al. | |
| 7,224,262 B2 | 5/2007 | Simon et al. | |
| 7,279,640 B2 | 10/2007 | White et al. | |
| 7,341,264 B2 | 3/2008 | Swannie | |
| 7,400,058 B1 | 7/2008 | Wayne et al. | |
| 7,463,136 B2 | 12/2008 | Ungerman | |
| 7,557,699 B2 | 7/2009 | Walton | |
| 7,661,210 B2 | 2/2010 | Shepherd | |
| 7,973,651 B2 | 7/2011 | Stiles et al. | |
| 8,061,879 B2 | 11/2011 | Simmons et al. | |
| 8,068,961 B2 | 11/2011 | Menze | |
| 8,185,276 B2 | 5/2012 | Buckbee et al. | |
| 8,203,445 B2 | 6/2012 | Recker et al. | |
| 8,552,852 B1 | 10/2013 | Hertz et al. | |
| 9,278,654 B2 | 3/2016 | Orazem | |
| 9,751,452 B2 * | 9/2017 | Orazem | B60Q 1/0088 |
| 2003/0039126 A1 * | 2/2003 | Fox | B60Q 1/302 362/485 |
| 2005/0047031 A1 | 3/2005 | Naito | |
| 2007/0120654 A1 | 5/2007 | Walton | |
| 2008/0073090 A1 | 3/2008 | Harris | |
| 2008/0079552 A1 | 4/2008 | Schultz | |
| 2012/0134389 A1 | 5/2012 | Pahlavan et al. | |
| 2014/0052335 A1 | 2/2014 | Moon, Jr. et al. | |

* cited by examiner

METHOD AND APPARATUS FOR INSTALLING AND OPERATING AN AUXILIARY LIGHTING SYSTEM USING A VEHICLE ELECTRIC PLUG This application is a continuation-in-part of U.S. patent application Ser. No. 14/871,858 filed Sep. 30, 2015, which is a continuation-in-part of U.S. patent application Ser. No. 14/809,390 filed Jul. 27, 2015, which is a division of U.S. patent application Ser. No. 14/680,367, filed Apr. 7, 2015, which is a continuation-in-part of U.S. patent application Ser. No. 14/622,211, filed Feb. 13, 2015, which claims priority to U.S. Provisional Patent Application No. 62/104,570, filed Jan. 16, 2015, the contents of which are incorporated herein by reference.

TECHNICAL FIELD

This invention relates to a method for installing and operating an auxiliary lighting system using a vehicle's electric plug.

BACKGROUND

FIG. 1 illustrates a known vehicle 10 in schematic representation showing numerous components including a battery 12 and exterior vehicle lights. The exterior vehicle lights include headlights 14 which illuminate a ground surface in front of the vehicle 10 upon which the vehicle 10 travels as is well known to those of skill in the art. The headlights 14 may include low and high beams. The exterior vehicle lights may also include one or more supplemental lights 16 which may be positioned at the front and the rear of the vehicle 10 and sometimes the sides of the vehicle as well. Numerous supplemental lights 16 are well known and include turn signal lights, park lights, running lights, and brake lights, though brake lights 18 typically are only provided at the rear of the vehicle 10, as shown. As is also known, sometimes the same light source, such as a light bulb or light emitting diode (LED), may serve more than one supplemental light purpose; such as a brake light and a turn signal light.

Still referring to FIG. 1, an operator adjustable vehicle light control 20, typically positioned within the vehicle interior, can be adjusted by a user in order to control the exterior vehicle lights; such as to turn the exterior vehicle lights into ON and OFF conditions and/or adjust the intensity of illumination. Vehicle light wiring 22 is used to electrically connect the operator adjustable vehicle light control 22 to the vehicle headlights 14, and the supplemental lights 16. The vehicle 10 may include at least one brake 24, four shown at the four wheels, which are operable to slow down the vehicle's speed in a known manner. A braking device 26, such as a brake pedal, may be operated by the user to activate the brakes 24. In order to illuminate the brake lights 18, the braking device 26 may be electrically connected to the vehicle light wiring 22, as shown. As the basic operation of external vehicle lights is well known to those of skill in the art, further details will not be provided here.

FIG. 2 illustrates the vehicle 10 of FIG. 1 but with an auxiliary implement 30, in the form of a snowplow, mounted onto the front of the vehicle 10. An operator adjustable auxiliary implement control 34 may be operated by the user to operate one or more functions of the auxiliary implement 30; such as to raise and lower a snowplow blade 36 by way of a hydraulic unit 38. The vehicle's headlights 14 and front positioned supplemental lights 16, however, are commonly obscured by the auxiliary implement 30. Therefore, an auxiliary lighting system 32, including auxiliary headlights 40 and auxiliary supplemental lights 42, are used in place of, or in addition to, the vehicle headlights 14 and supplemental lights 16. While known auxiliary lighting systems generally work well for their intended purposes, they are known to have problems.

One problem with known auxiliary lighting systems, with reference to FIGS. 1 and 2, is that numerous electrical connections must be made between the auxiliary wiring 44 and the vehicle light wiring 22 so that the auxiliary headlights 40 and auxiliary supplemental lights 42 can be coordinated, powered, and controlled by the vehicle's existing electrical system including the operator adjustable vehicle light control 20. Current installation techniques involve disconnecting the vehicle's original equipment manufacturer ("OEM") light wiring 22, often in the form of a harness, and splicing or otherwise connecting the new auxiliary wiring 44, also often in the form of a harness, to the OEM wiring 22 in order to provide auxiliary lighting. This part of the process is labor intensive and objectionable as it requires altering the vehicle's existing electrical system. For example, the time necessary to initially install and mount a snowplow that utilizes an auxiliary lighting system to a vehicle is approximately four hours. The process of installing the auxiliary wiring 44 consumes approximately two and one half hours of that time. Furthermore, given the complexity of the electrical interconnections required, an electrical technician should be used to assure that proper connections have been made.

Therefore, a simpler installation process would reduce the amount of time and effort necessary to install an auxiliary implement utilizing an auxiliary lighting system and would eliminate the need for major alterations to the vehicle's OEM electrical systems.

With reference now to FIG. 3, many vehicles that are suited to operate an auxiliary implement, such as a snowplow or spreader, are trucks or other vehicles that include a trailer hitch 52 that includes a hitch receiver 54 and a trailer plug 50 that may be protected with a lid or cover 56. It is believed that approximately 95% of trucks currently manufactured feature trailer hitches. More recently, manufacturers offer trucks with towing packages, including a hitch receiver and a trailer plug, installed as standard equipment. Trucks that do not include these features as standard equipment from the manufacturer have the towing package available as an option from the factory. Vehicles other than trucks, such as cars and all-terrain vehicles (also known as "ATVs") may also offer such hitch receivers and/or trailer plugs and may also be candidates for embodiments of this invention. A hitch receiver 54, as is well known to those of skill in the art, is a tube adapted to receive a portion of a trailer or other device so that the trailer or other device can be physically attached to the vehicle.

FIG. 4 shows a vehicle 10A that is similar to vehicle 10 shown in FIGS. 1 and 2 except for the addition of trailer plug 50. A trailer plug, as is well known to those of skill in the art, is a type of electric plug. Each trailer plug 50 includes wiring that indicates the condition of the vehicle supplemental lights 16. Trailer plugs come in multiple varieties and are designed to power and control trailer features such as brake lights, turn signals, running lights, and the like. The two most common trailer plugs are the 7-way plug and the 4-way plug, which will be discussed further below. Many trucks now come with the 7-way plug installed from the factory, as discussed above. Other common plugs include a 6-way, a 5-way, and a 4-way plug. There are also a wide variety of European type trailer plugs with different wiring configurations than those just described.

SUMMARY

According to some embodiments of this invention, an auxiliary apparatus may be used with an associated vehicle having: exterior vehicle lights that include at least one vehicle headlight that illuminates a ground surface in front of the associated vehicle upon which the associated vehicle travels and at least one vehicle supplemental light that is at least one of a turn signal light and a park light; an operator adjustable vehicle light control with which a user can control the exterior vehicle lights; a power source; and, a vehicle electric plug that indicates the condition of the vehicle supplemental light. The auxiliary apparatus may comprise: an auxiliary implement that: (1) comprises an operator adjustable auxiliary implement control; and, (2) is removably mountable to the associated vehicle; an auxiliary lighting system that: (1) is designed for use with the auxiliary implement; (2) comprises at least one auxiliary headlight designed to illuminate the ground surface upon which the associated vehicle travels in place of the vehicle headlight; (3) comprises at least one auxiliary supplemental light that is at least one of a turn signal light and a park light; and, (4) comprises an operator adjustable auxiliary light control; auxiliary wiring that is designed to: (1) electrically hardwire connect the power source to: the auxiliary implement; and, the auxiliary lighting system; (2) transfer power from the power source to: the auxiliary implement; and, the auxiliary lighting system; (3) electrically hardwire connect the vehicle electric plug to the auxiliary lighting system; and, (4) transmit an electrical signal from the vehicle electric plug to the auxiliary lighting system. When the auxiliary wiring is properly connected: (1) the operator adjustable auxiliary implement control is operable to operate at least one function of the auxiliary implement; (2) the operator adjustable auxiliary light control is operable to operate the at least one auxiliary headlight; and, (3) the operator adjustable vehicle light control is operable to operate the at least one auxiliary supplemental light.

According to other embodiments of this invention, a method of using an auxiliary lighting system with an associated vehicle may be used. The associated vehicle may include: exterior vehicle lights that include at least one vehicle headlight that illuminates a ground surface in front of the associated vehicle upon which the associated vehicle travels and at least one vehicle supplemental light that is at least one of a turn signal light and a park light; an operator adjustable vehicle light control with which a user can control the exterior vehicle lights; a power source; and, a vehicle electric plug that indicates the condition of the vehicle supplemental light. The method may comprise the steps of: (A) providing an auxiliary implement comprising an operator adjustable auxiliary implement control; (B) providing an auxiliary lighting system that: (1) is designed for use with the auxiliary implement; (2) comprises at least one auxiliary headlight; (3) comprises at least one auxiliary supplemental light that is at least one of a turn signal light and a park light; and, (4) comprises an operator adjustable auxiliary light control; (C) providing auxiliary wiring; (D) designing the auxiliary implement, the auxiliary lighting system, and the auxiliary wiring to be operable according to the following steps: (1) mounting the auxiliary implement to the associated vehicle; (2) mounting the auxiliary lighting system to at least one of the associated vehicle and the auxiliary implement; (3) electrically hardwire connecting the auxiliary wiring to electrically hardwire connect the power source to: the auxiliary implement and the auxiliary lighting system; (4) electrically hardwire connecting the auxiliary wiring to electrically hardwire connect the vehicle electric plug to the auxiliary lighting system; (5) transferring power from the power source to: the auxiliary implement and the auxiliary lighting system; (6) transmitting an electrical signal from the vehicle electric plug to the auxiliary lighting system; (7) using the operator adjustable vehicle light control to operate the at least one auxiliary supplemental light based directly or indirectly on the electrical signal; (8) using the operator adjustable auxiliary light control to operate the at least one auxiliary headlight to illuminate the ground surface upon which the associated vehicle travels in place of the vehicle headlight; and, (9) using the operator adjustable auxiliary implement control to operate at least one function of the auxiliary implement.

According to still other embodiments of this invention, an apparatus may comprise: a vehicle comprising: (1) exterior vehicle lights that include at least one vehicle headlight that illuminates a ground surface in front of the vehicle upon which the vehicle travels; and, at least one vehicle supplemental light that is at least one of a turn signal light and a park light; (2) an operator adjustable vehicle light control with which a user can control the exterior vehicle lights; (3) a power source; and, (4) a vehicle electric plug that indicates the condition of the vehicle supplemental light; an auxiliary implement that: (1) comprises an operator adjustable auxiliary implement control; and, (2) is removably mountable to the vehicle; an auxiliary lighting system that: (1) is designed for use with the auxiliary implement; (2) comprises at least one auxiliary headlight designed to illuminate the ground surface upon which the vehicle travels in place of the vehicle headlight; (3) comprises at least one auxiliary supplemental light that is at least one of a turn signal light and a park light; and, (4) comprises an operator adjustable auxiliary light control; and, auxiliary wiring that is designed to: (1) electrically hardwire connect the power source to: the auxiliary implement; and, the auxiliary lighting system; (2) transfer power from the power source to: the auxiliary implement; and, the auxiliary lighting system; (3) electrically hardwire connect the vehicle electric plug to the auxiliary lighting system; and, (4) transmit an electrical signal from the vehicle electric plug to the auxiliary lighting system. When the auxiliary wiring is properly connected: (1) the operator adjustable auxiliary implement control is operable to operate at least one function of the auxiliary implement; (2) the operator adjustable auxiliary light control is operable to operate the at least one auxiliary headlight; and, (3) the operator adjustable vehicle light control is operable to operate the at least one auxiliary supplemental light.

Numerous benefits and advantages of this invention will become apparent to those skilled in the art to which it pertains upon reading and understanding of the following detailed specification.

DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Figure 5:
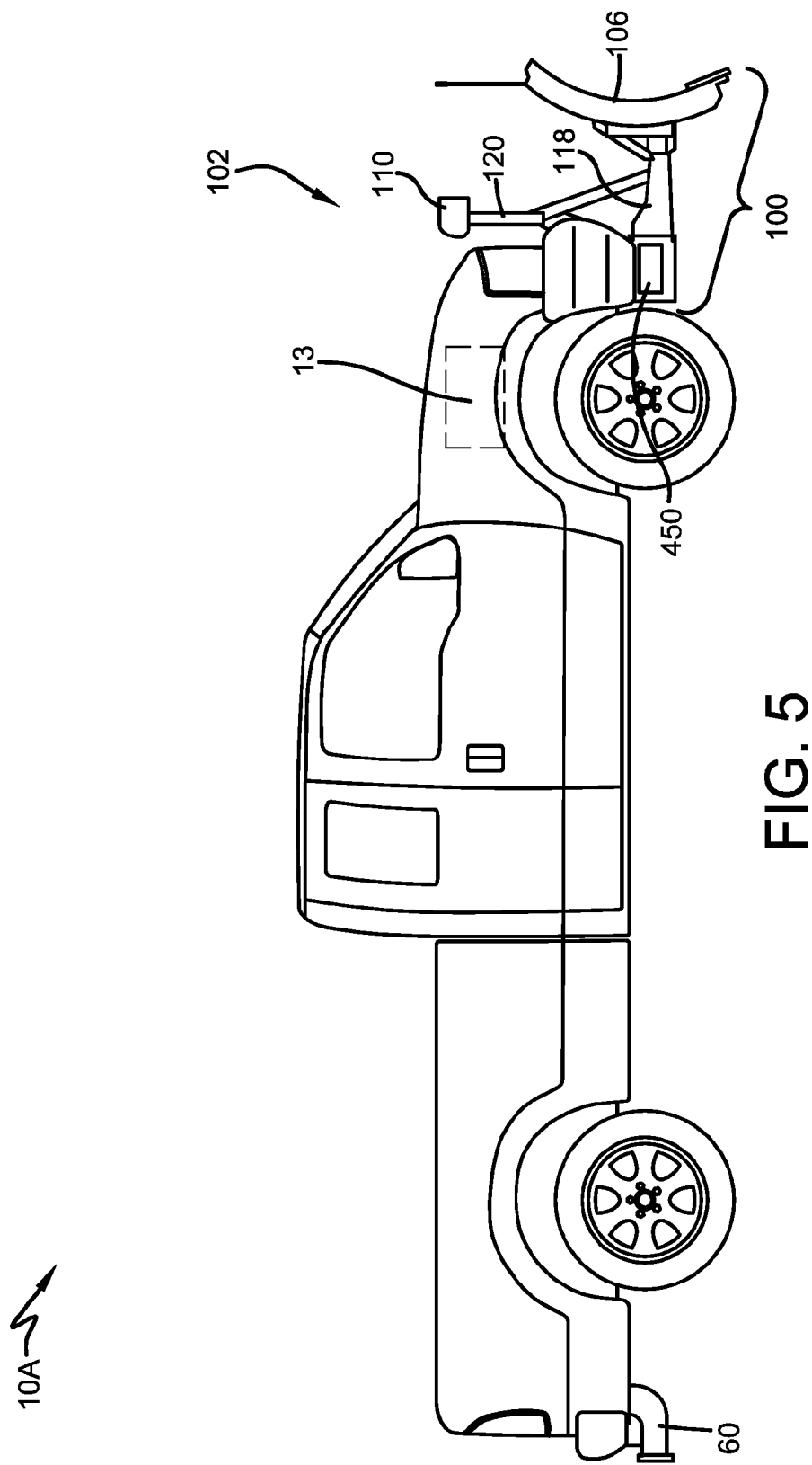
FIG. 5 a side view of a vehicle with a snowplow implement and a vehicle electric plug.
Figure 6:
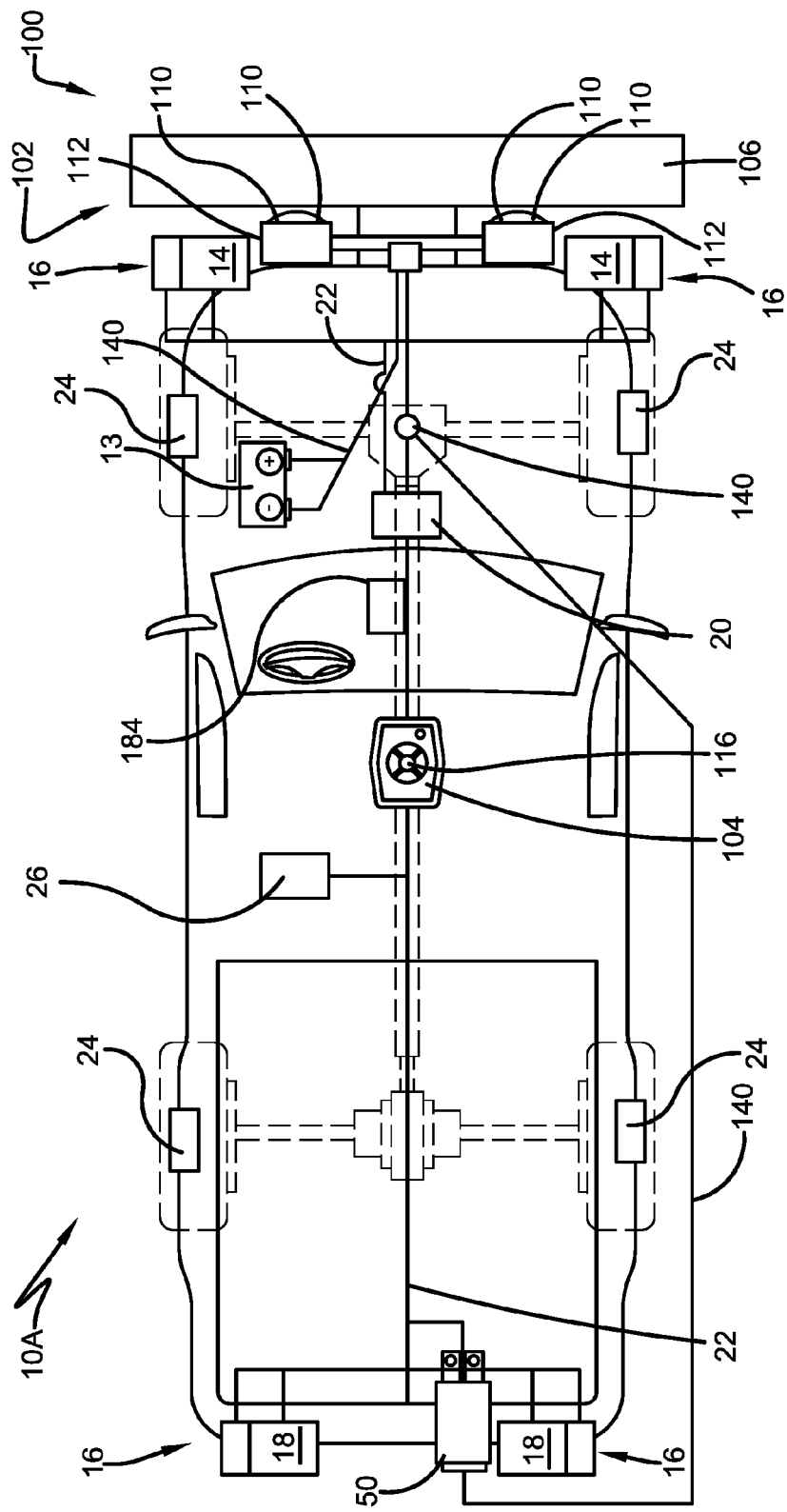
FIG. 6 is a top view of a vehicle in schematic representation showing embodiments of this invention.
Figure 7:
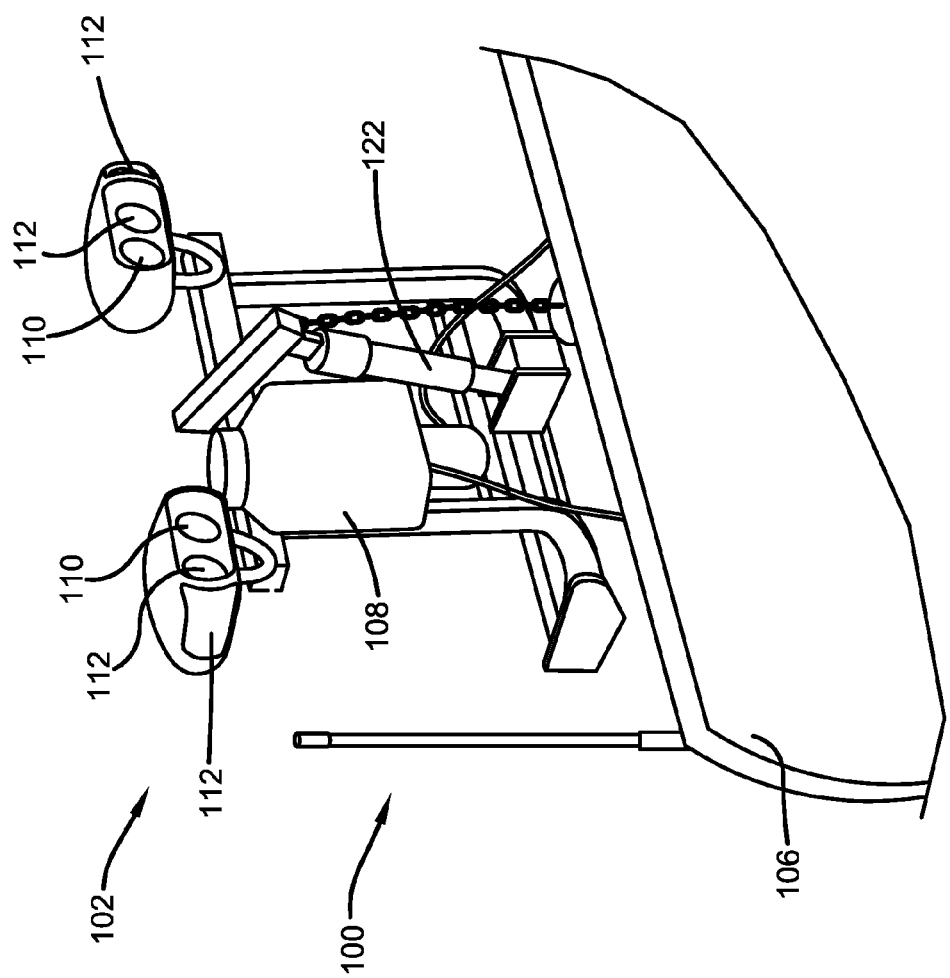
FIG. 7 is a front perspective view of a snowplow implement.

With reference now to FIGS. 5-7, vehicle 10A (or any other vehicle equipped with the appropriate electric plug and chosen by a person of skill in the art) may be equipped with an auxiliary implement 100 and an auxiliary lighting system 102, according to some embodiments of this invention. The auxiliary implement 100 may be removably mountable to the vehicle 10A and may include an operator adjustable auxiliary implement control 104 that is operable to operate at least one function of the auxiliary implement 100. The particular auxiliary implement, and thus the particular function that is operated, can be any chosen with the sound judgment of a person of skill in the art. In some embodiments, the auxiliary implement may be a snow and/or ice removal implement; such as a snowplow assembly or a spreader assembly. For the embodiment shown in FIGS. 5-7, the auxiliary implement 100 is a snowplow assembly including a snowplow blade 106 which may be position adjusted using a hydraulic unit 108. The snowplow assembly may further comprise a plow frame 118, a lift frame 120, a lift cylinder 122 and all other parts associated with the snowplow assembly as is well known to those of skill in the art. The operator adjustable auxiliary implement control 104 may be operated, for example, to raise and/or lower and/or laterally position the snowplow blade 106 using the hydraulic unit 108.

Figure 8:
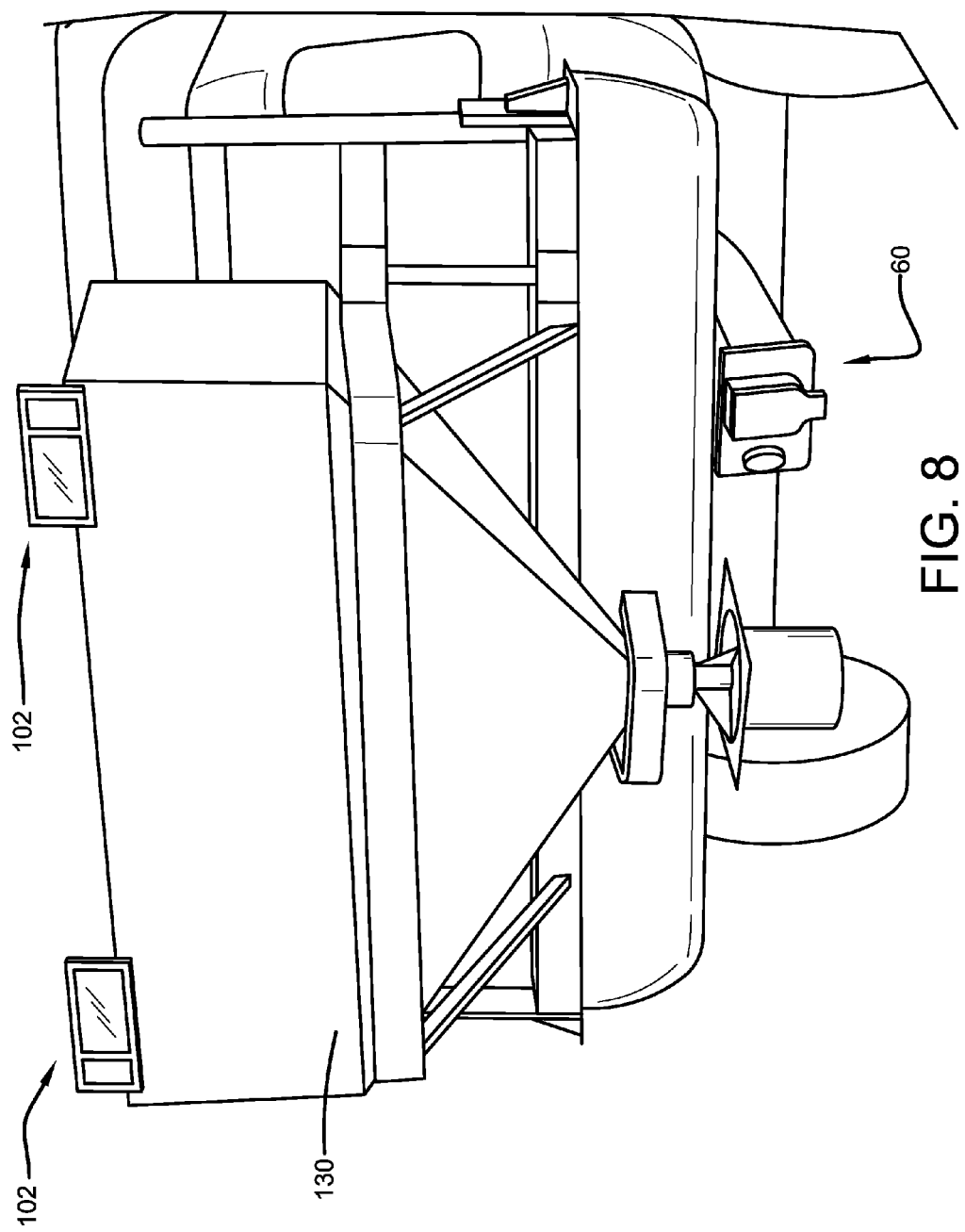
FIG. 8 is a back perspective view of a vehicle with a salt spreader attached thereto.

FIG. 8 shows another snow and/or ice removal implement in the form of a salt spreader 130 that may be mountable to a vehicle and use embodiments of this invention. The spreader 130 may include an auxiliary lighting system 102 that is operated using a signal from a vehicle electric plug 60 as will be discussed further below. Non-limiting examples of other snow and/or ice removal auxiliary implements that may be used with this invention include power brooms, sweepers, and the like. As the operation of auxiliary implements are known to those of skill in the art, further details will not be provided here.

With reference now to FIGS. 5-7, the auxiliary lighting system 102 may be designed for use with the auxiliary implement 100 and may include at least one auxiliary headlight 110 designed to illuminate the ground surface upon which the vehicle travels in place of the vehicle headlight 14 and at least one auxiliary supplemental light 112, such as a turn signal light, a park light, or any other supplemental light chosen with the sound judgment of a person of skill in the art. An operator adjustable auxiliary light control 116 may be operable to operate the auxiliary headlight 110 as will be discussed further below.

Figure 9:
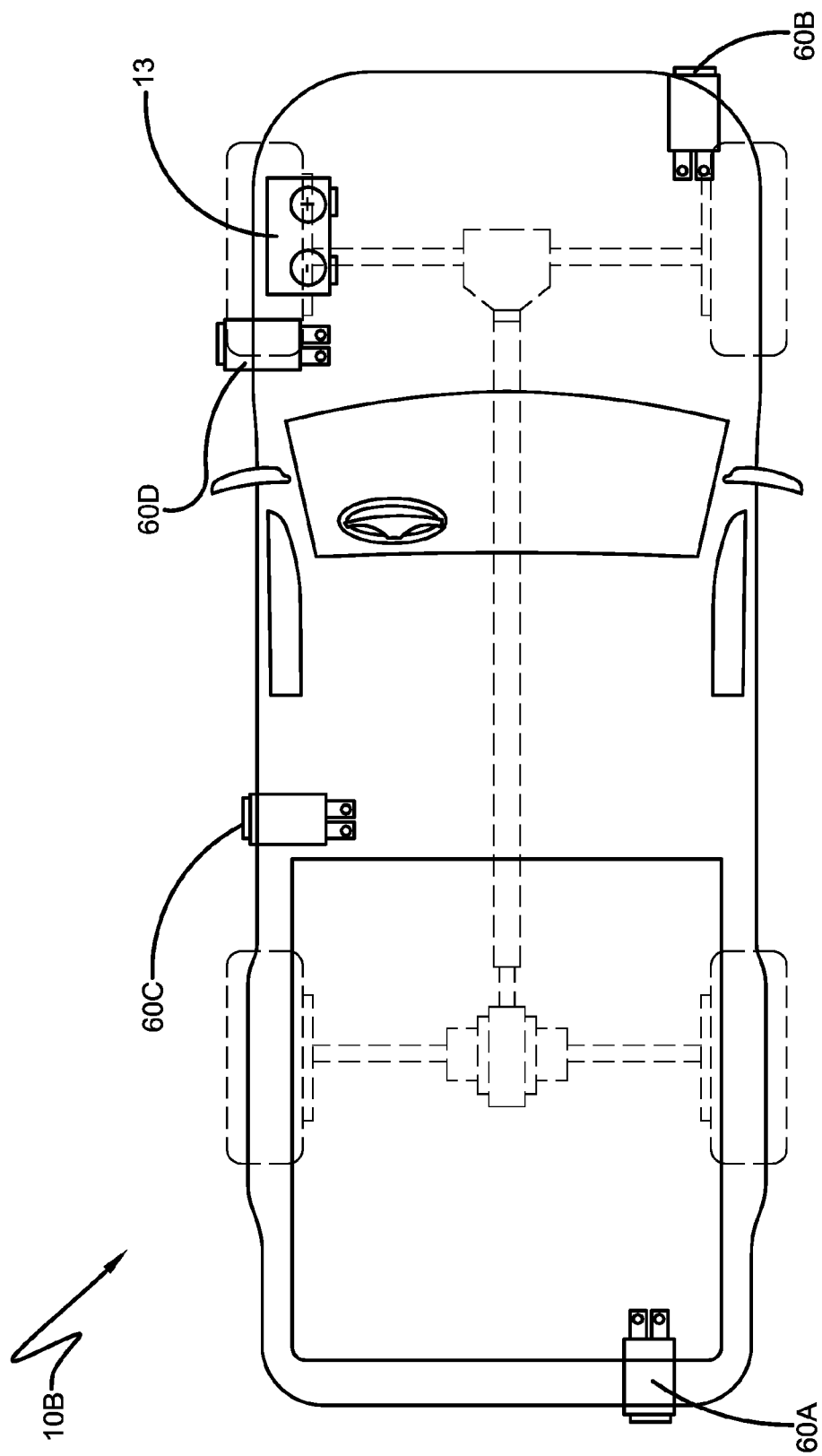
FIG. 9 is a top view of a vehicle in schematic representation showing embodiments of vehicle electric plug locations.

With reference now to FIGS. 3-6 and 8-9, a trailer plug, as is well known to those of skill in the art, is an electrical connector plug that indicates the condition of one or more of the vehicle supplemental lights 16 and that is positioned on the rear end of the vehicle 10A. An electrical connector is any type of electrical apparatus that enables one or more electrical wires, cables, harnesses, or devices to be electrically connected. An electric plug is an electrical connector that comprises one or more male extensions and/or female sockets that engage with corresponding female sockets and/or male extensions in one or more corresponding electric plugs to complete an electric connection. While this invention is designed to work with a vehicle's trailer plug, it should be noted that this invention will work with any electrical connector, an electric plug or otherwise, that indicates the condition of one or more of the vehicle supplemental lights. FIG. 9 is a schematic representation of a vehicle 10B which may be similar to vehicle 10A described above. Reference 60 again indicates a vehicle electric plug that indicates the condition of one or more of the vehicle supplemental lights and the corresponding letter indicates the various possible locations for the vehicle electric plug 60. Thus, the vehicle electric plug 60 may be positioned at the rear of the vehicle, as is typically known and thus referred to as a "trailer plug," as is shown with reference 60A. Alternatively, or in addition, a vehicle electric plug may be positioned at the front of the vehicle as shown with reference 60B. Yet other alternative or additional embodiments include positioning a vehicle electric plug at the side of the vehicle as shown with reference 60C and/or near a power source 13 as shown with reference 60D.

The power source 13 may be any power source chosen with the sound judgment of a person of skill in the art to provide appropriate power used as will be discussed further below. Non-limiting examples of power sources 13 that may be used with embodiments of this invention include a vehicle battery, a fuel cell, an electric motor, a hydraulic motor, a pneumatic motor and an internal combustion engine. It should be understood that the location of the electrical connector such as an electric plug when used with this invention can be any location chosen with the sound judgment of a person of skill in the art.

Figure 3:
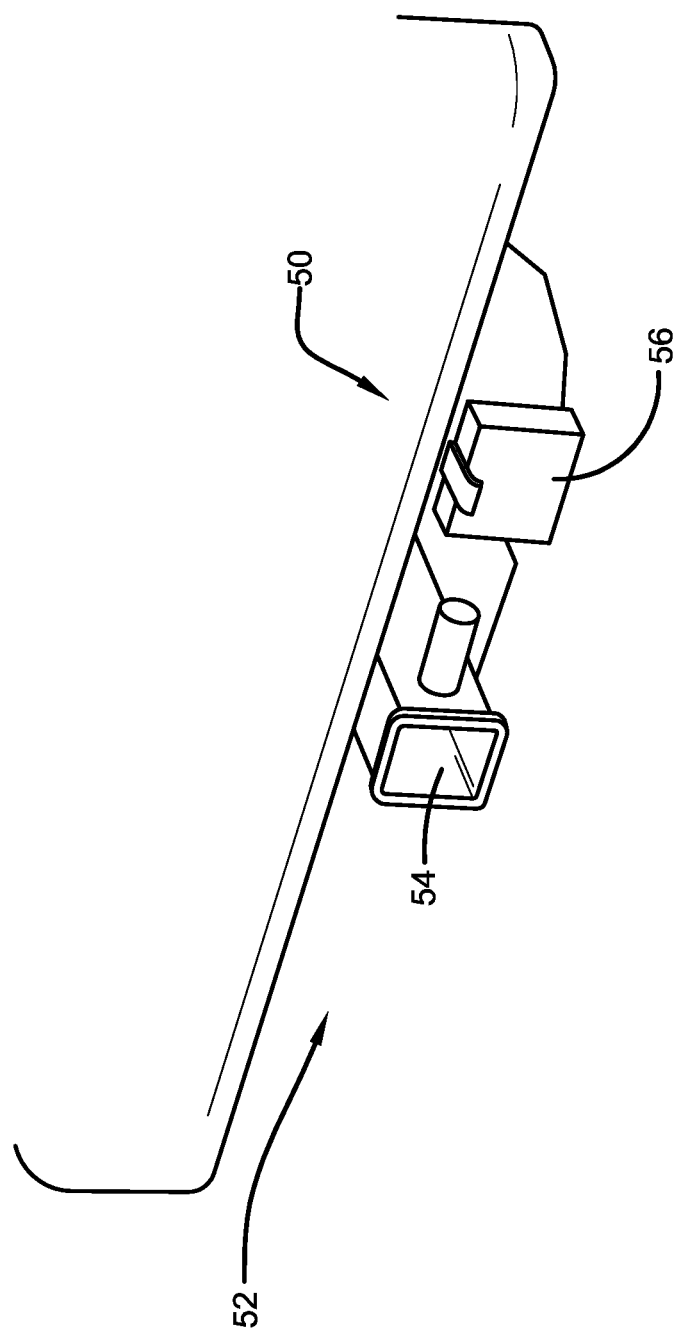
FIG. 3 is a back perspective view of a known vehicle showing the trailer hitch including a trailer plug.
Figure 4:
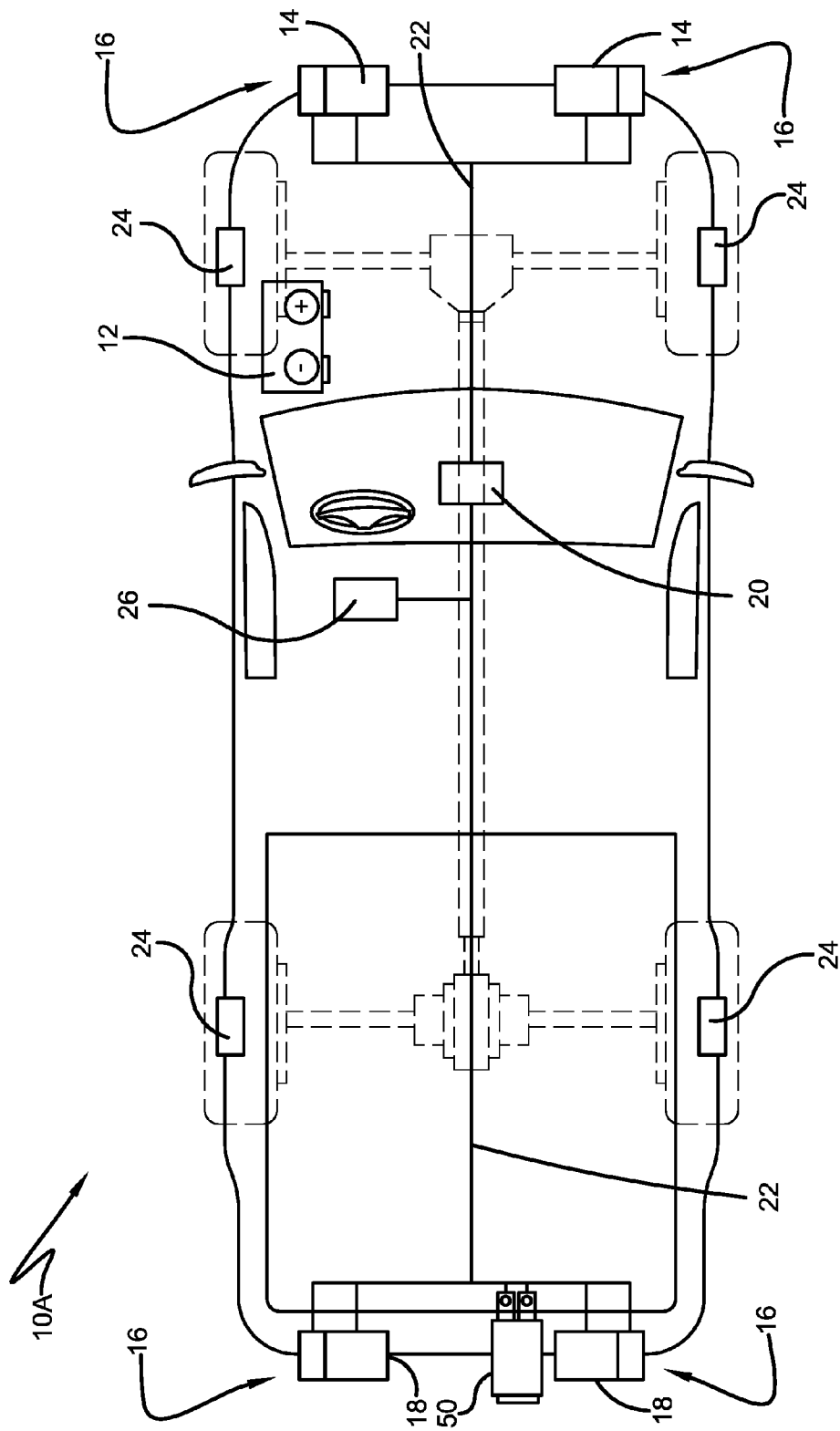
FIG. 4 is a top view of a known vehicle in schematic representation.
Figure 10A:
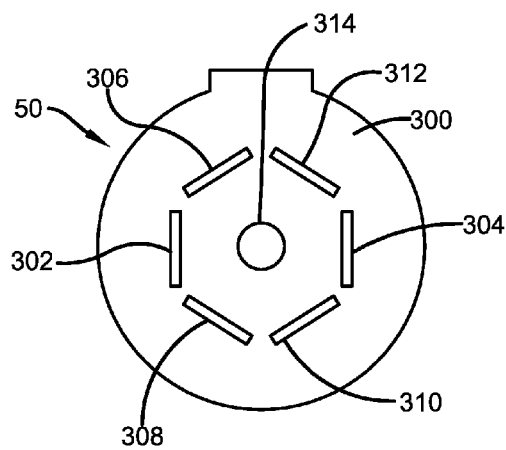
FIG. 10A is a close-up, end view of a 7-way plug.
Figure 10B:
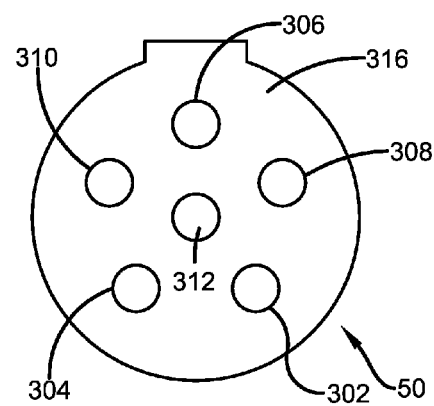
FIG. 10B is a close-up, end view of a 6-way plug.
Figure 10C:
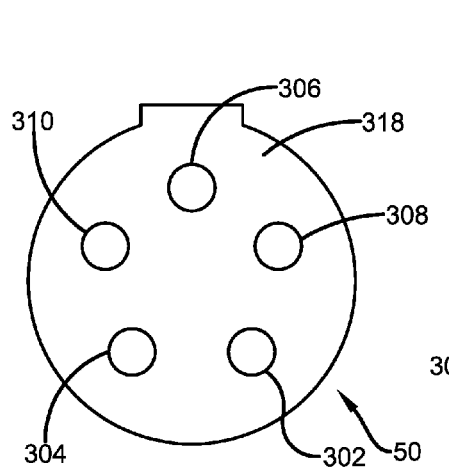
FIG. 10C is a close-up, end view of a 5-way plug.
Figure 10D:
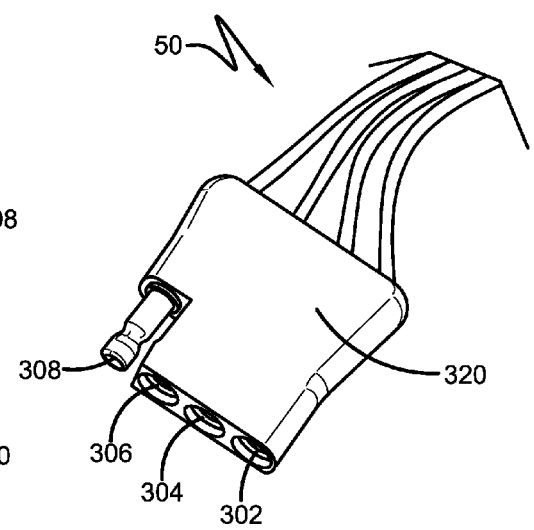
FIG. 10D is a close-up, perspective view of a 4-way plug.

With reference now to FIGS. 10A-10D, as noted above, there are several types of known trailer plugs 50. FIG. 10A illustrates a 7-way trailer plug; FIG. 10B illustrates a 6-way trailer plug; FIG. 10C illustrates a 5-way trailer plug; and, FIG. 10D illustrates a 4-way trailer plug. Each trailer plug 50 may be factory installed on the vehicle or installed by an aftermarket or third party installer, without limitation. The trailer plug 50 may include a lid or cover 56, as shown in FIGS. 3 and 8, but a cover is not required for this invention. FIG. 10A illustrates a standard 7-way plug 300 that includes seven electrical connections with each of these connections designed to provide power and/or control over some portion(s) of a trailer (not shown). One known set of connections are: (1) for a left turn signal 302 (also used for braking); (2) for a right turn signal 304 (also used for braking); (3) for tail lights 306 (also for marker lights); (4) a ground wire 308; (5) for trailer power brakes 310; (6) an auxiliary power connection 312; and, (7) for reverse lights 314. FIG. 10B illustrates a 6-way plug 316 with these six connections: (1) for a left turn signal 302 (also used for braking); (2) for a right turn signal 304 (also used for braking); (3) for tail lights 306 (also for marker lights); (4) a ground wire 308; (5) for trailer power brakes 310; and, (6) an auxiliary power connection 312. FIG. 3C illustrates a 5-way plug 318 with these five connections: (1) for a left turn signal 302 (also used for braking); (2) for a right turn signal 304 (also used for braking); (3) for tail lights 306 (also for marker lights); (4) a ground wire 308; and, (5) for trailer power brakes 310. FIG. 3D illustrates a 4-way plug 320 with these four connections: (1) for a left turn signal 302 (also used for braking); (2) for a right turn signal 304 (also used for braking); (3) for tail lights 306 (also for marker lights); and, (4) a ground wire 308. It should be understood that the trailer plugs 50 just described are exemplary only as many variations are possible. While trailer plugs ordinarily come with hitch receivers, it should be understood that a hitch receiver is not required for this invention.

With reference now to FIGS. 5-7, 9, and 11-13, according to some embodiments of this invention auxiliary wiring 140 may be used for one or more purposes. The auxiliary wiring 140 may be designed in some embodiments to: (1) electrically connect the power source 13 to: the auxiliary implement 100; and/or the auxiliary lighting system 102; (2) transfer power from the power source 13 to: the auxiliary implement 100; and/or the auxiliary lighting system 102; (3) electrically connect the vehicle electric plug 50, 60 to the auxiliary lighting system 102; and, (4) transmit an electrical signal from the vehicle electric plug 50, 60 to the auxiliary lighting system 102. When the auxiliary wiring 140 is properly connected in some embodiments: (1) the operator adjustable auxiliary implement control 104 may be operable to operate at least one function of the auxiliary implement 100; (2) the operator adjustable auxiliary light control 116 may be operable to operate the auxiliary headlights 110; and, (3) the operator adjustable vehicle light control 20 may be operable to operate the auxiliary supplemental lights 112.

Figure 11A:
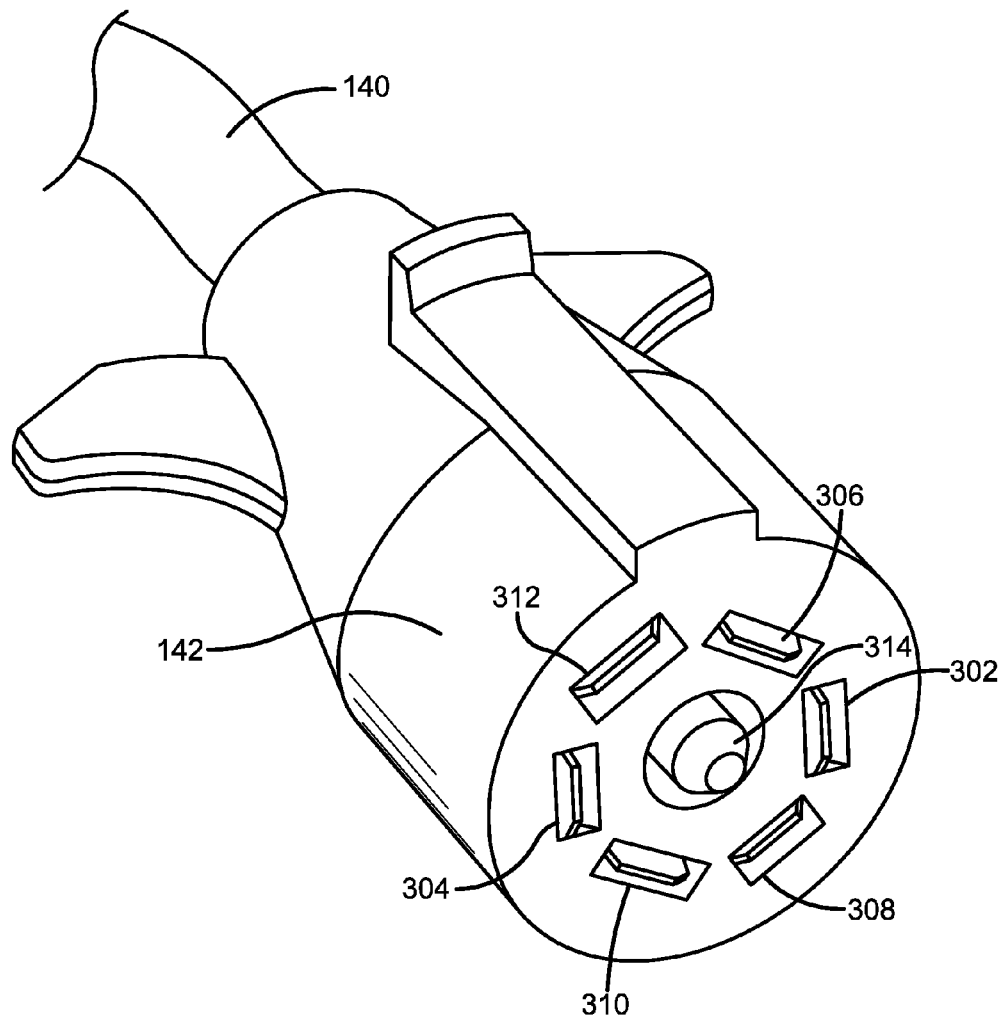
FIG. 11A is a perspective view of an electrical connector plug according to some embodiments of this invention.
Figure 11B:
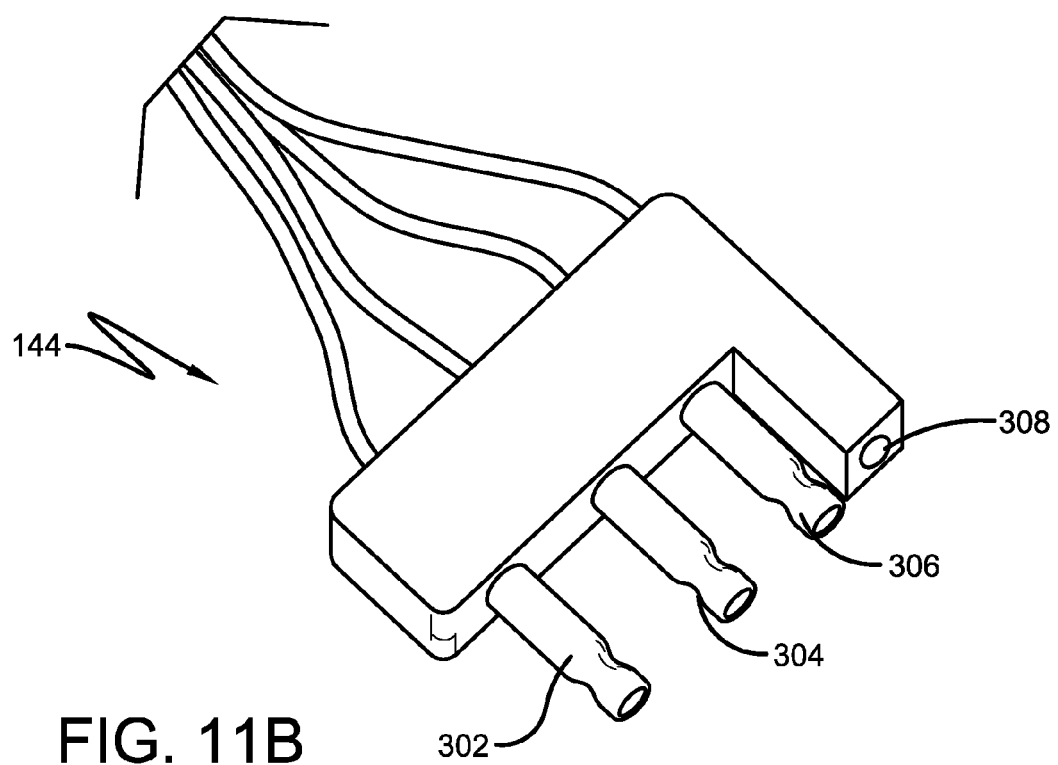
FIG. 11B is a perspective view of an electrical connector plug according to other embodiments of this invention.

To connect the auxiliary wiring 140 to the vehicle electric plug 60, the auxiliary wiring 140 may have an electrical connector plug that is suitable to electrically connect to (plug into) the particular vehicle electric plug 60. FIG. 11A shows one embodiment electrical connector plug 142 that is suitable to plug into the 7-way vehicle electric plug 300 shown in FIG. 10A. The same reference numbers are used in FIG. 11A as in FIG. 10A to indicate the correlating interconnections. Thus, for example, the electrical connector plug 142 connections are: (1) 302 to match or connect to connection 302 of the vehicle plug 300; (2) 304 to match or connect to connection 304 of the vehicle plug 300; (3) 306 to match or connect to connection 306 of the vehicle plug 300; (4) 308 to match or connect to connection 308 of the vehicle plug 300; (5) 310 to match or connect to connection 310 of the vehicle plug 300; (6) 312 to match or connect to connection 312 of the vehicle plug 300; and, (7) 314 to match or connect to connection 314 of the vehicle plug 300. Similarly, in other embodiments, the electrical connector plug can be formed to electrically connect to (plug into): vehicle plug 316 in FIG. 10B; electrical connector plug 318 in FIG. 10C; and, electrical connector plug 320 in FIG. 10D. FIG. 11B, for example, shows a electrical connector plug 144 that is formed to electrically connect to (plug into) vehicle plug 320 shown in FIG. 10D. The electrical connector plug can be formed to electrically connect to (plug into) any vehicle plug chosen with the sound judgment of a person of skill in the art.

Figure 12:
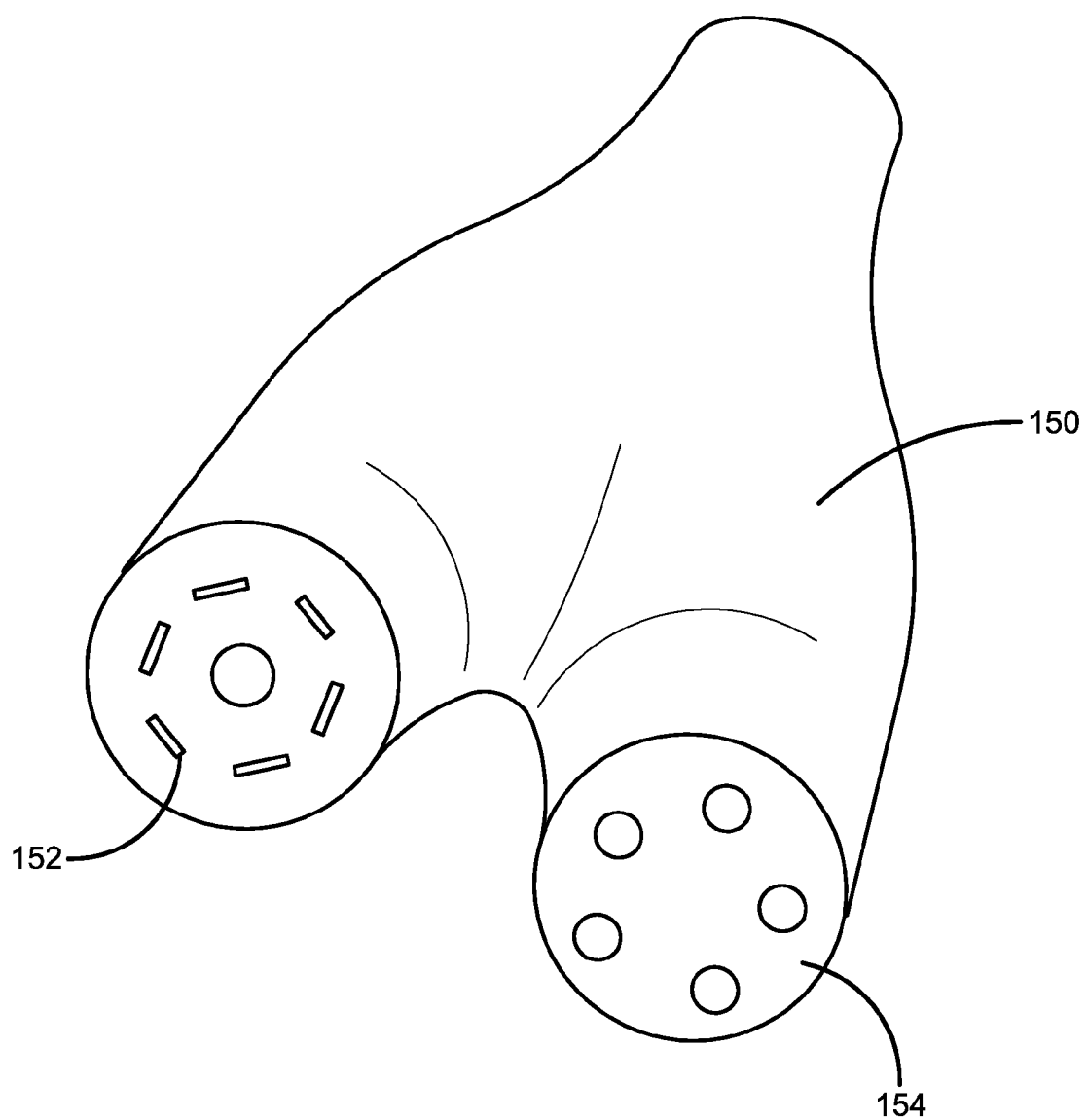
FIG. 12 is perspective view of one embodiment of an adapter.
Figure 13:
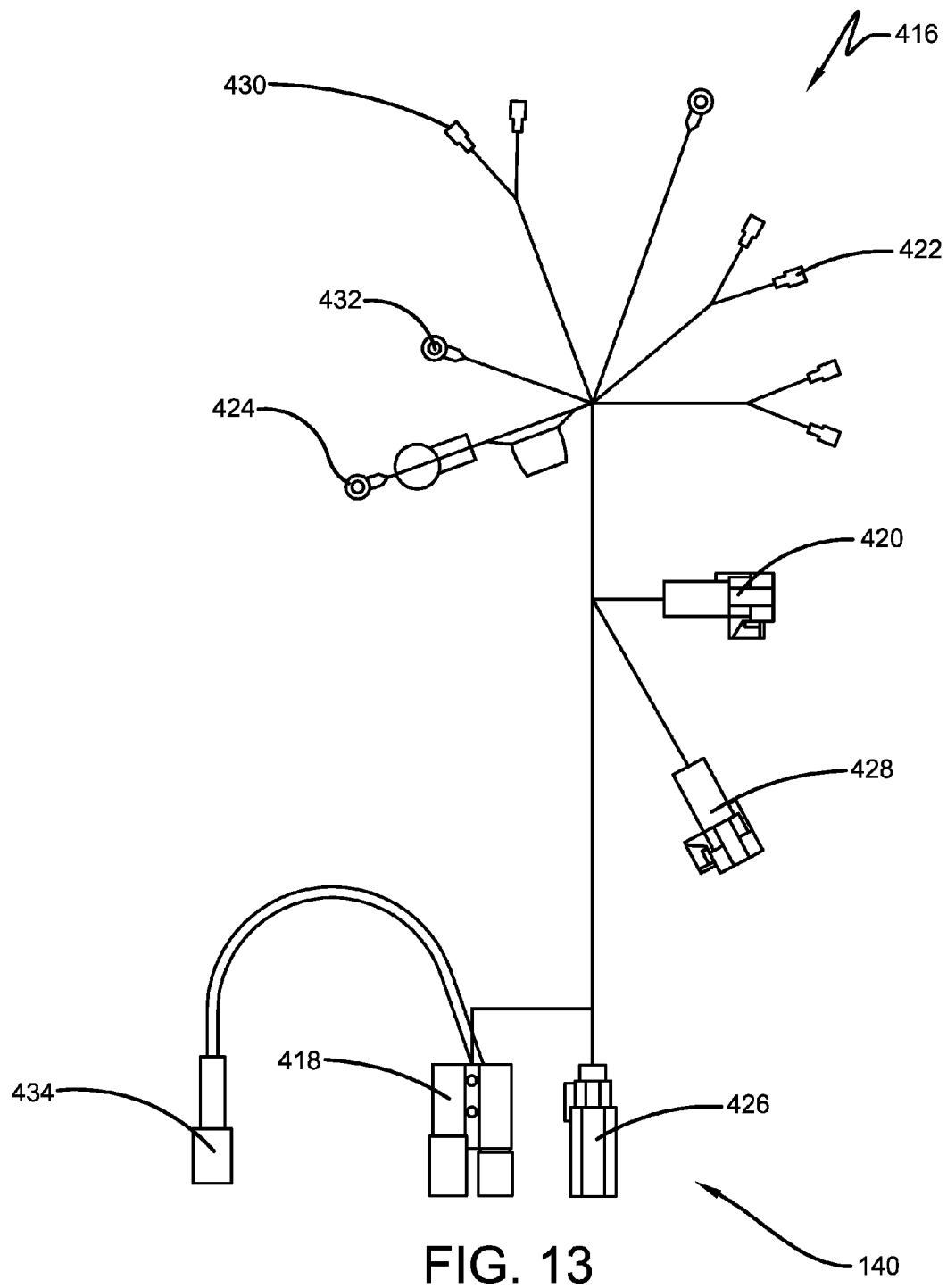
FIG. 13 is a schematic representation of a wiring harness according to some embodiments of this invention.
Figure 14:
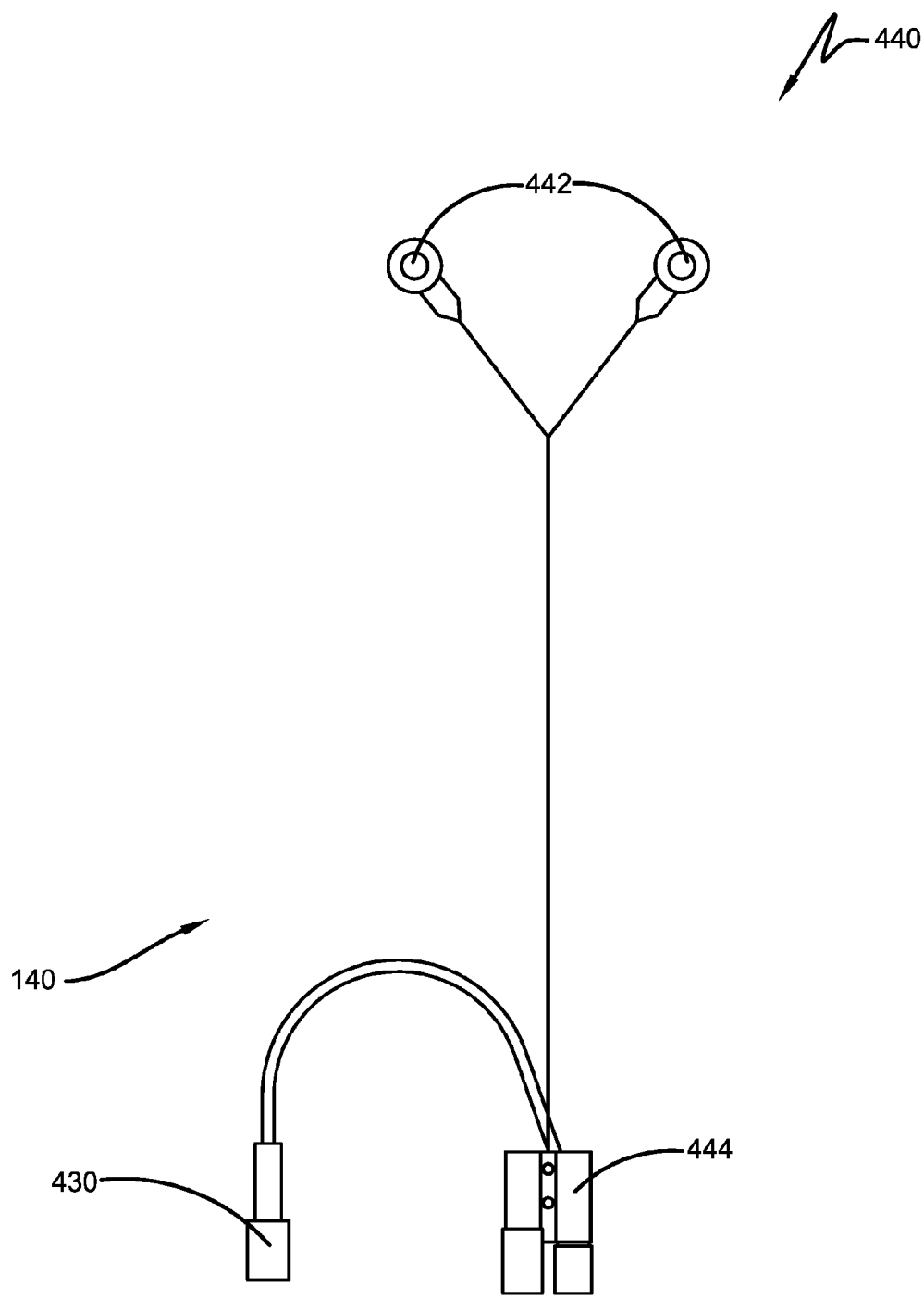
FIG. 14 is a schematic representation of a wiring harness according to some embodiments of this invention.
Figure 15:
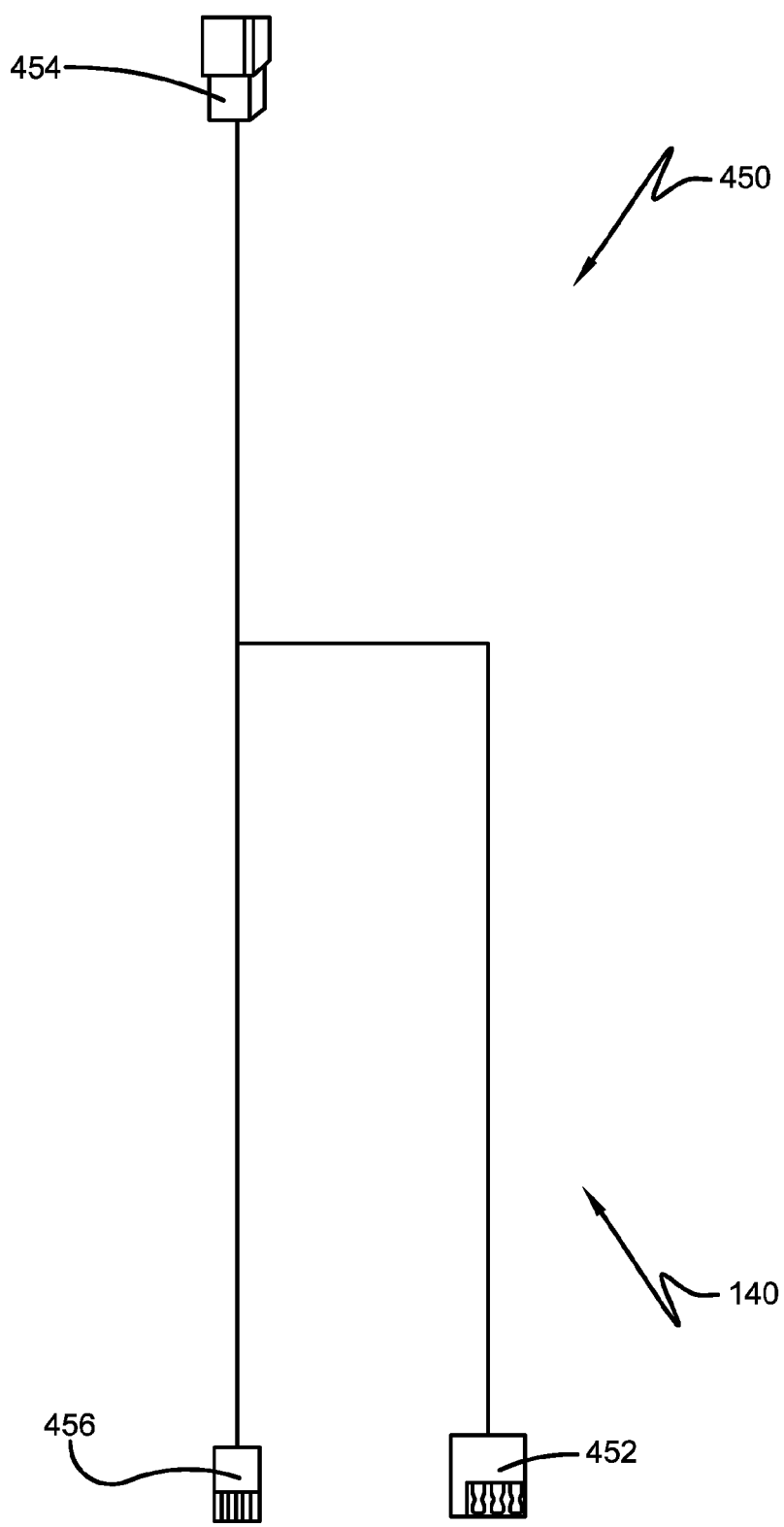
FIG. 15 is a schematic representation of a wiring harness according to some embodiments of this invention.
Figure 16:
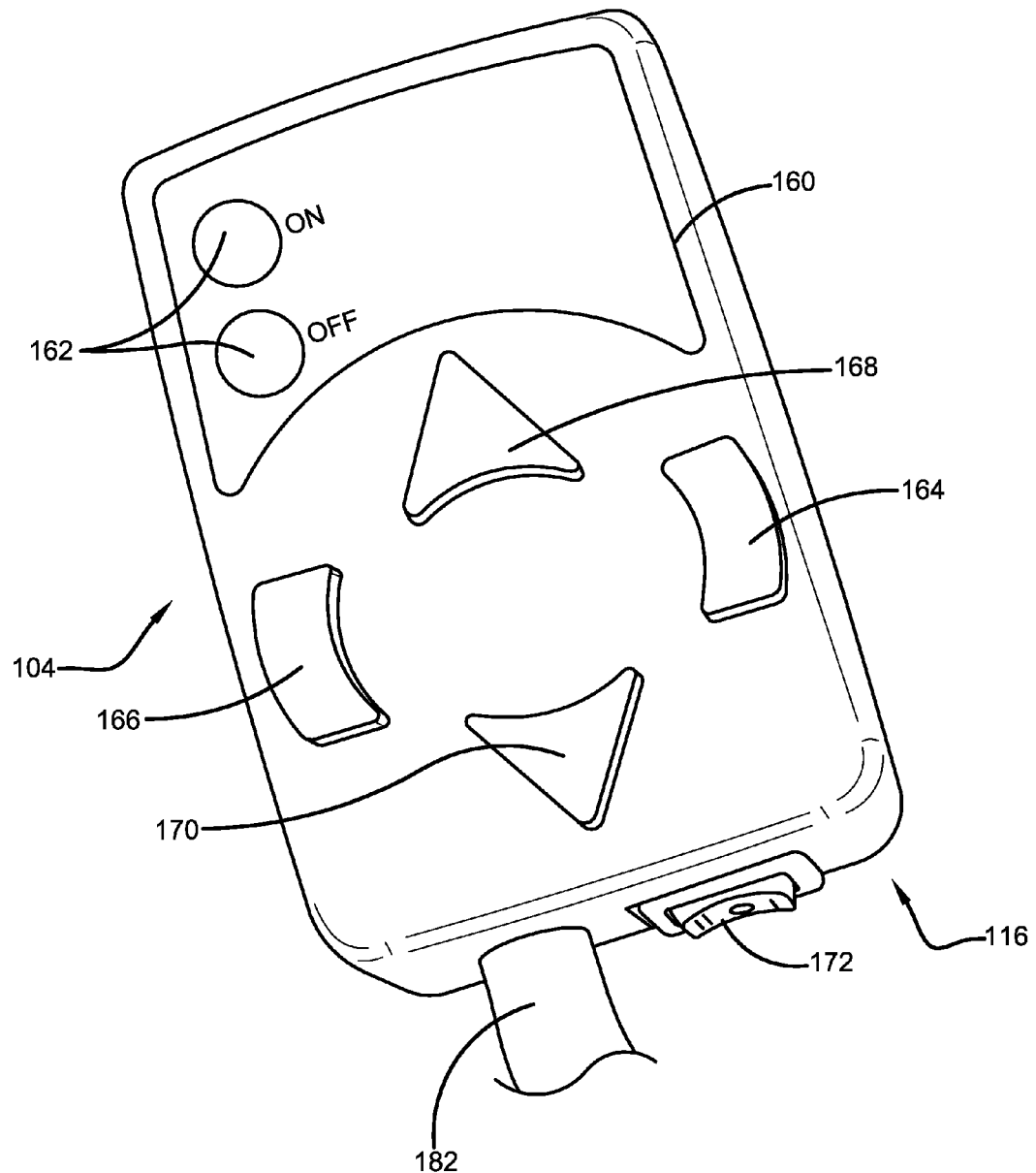
FIG. 16 is a top view of a control housing according to some embodiments of this invention.
Figure 17:
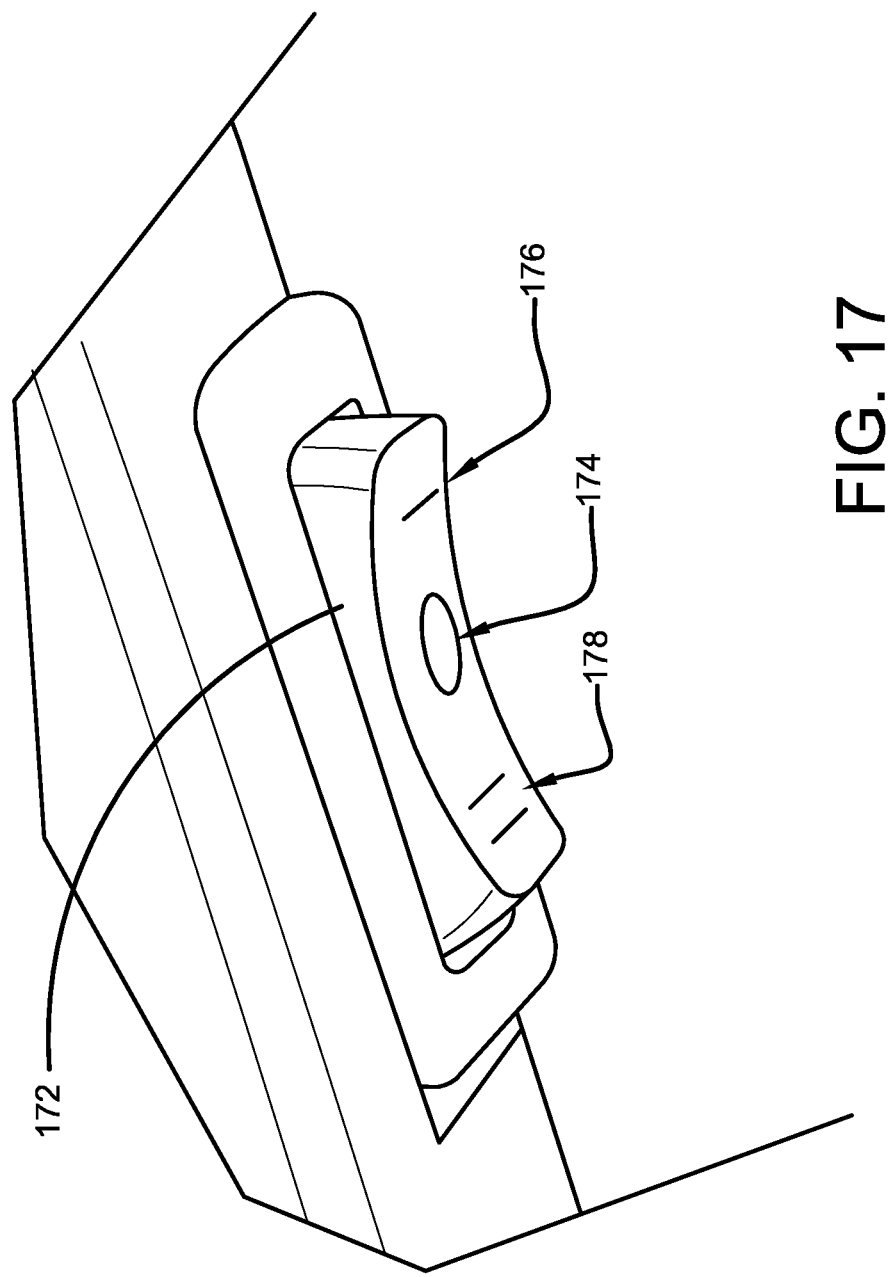
FIG. 17 is a top perspective view of a portion of the controller shown in FIG. 16.
Figure 18:
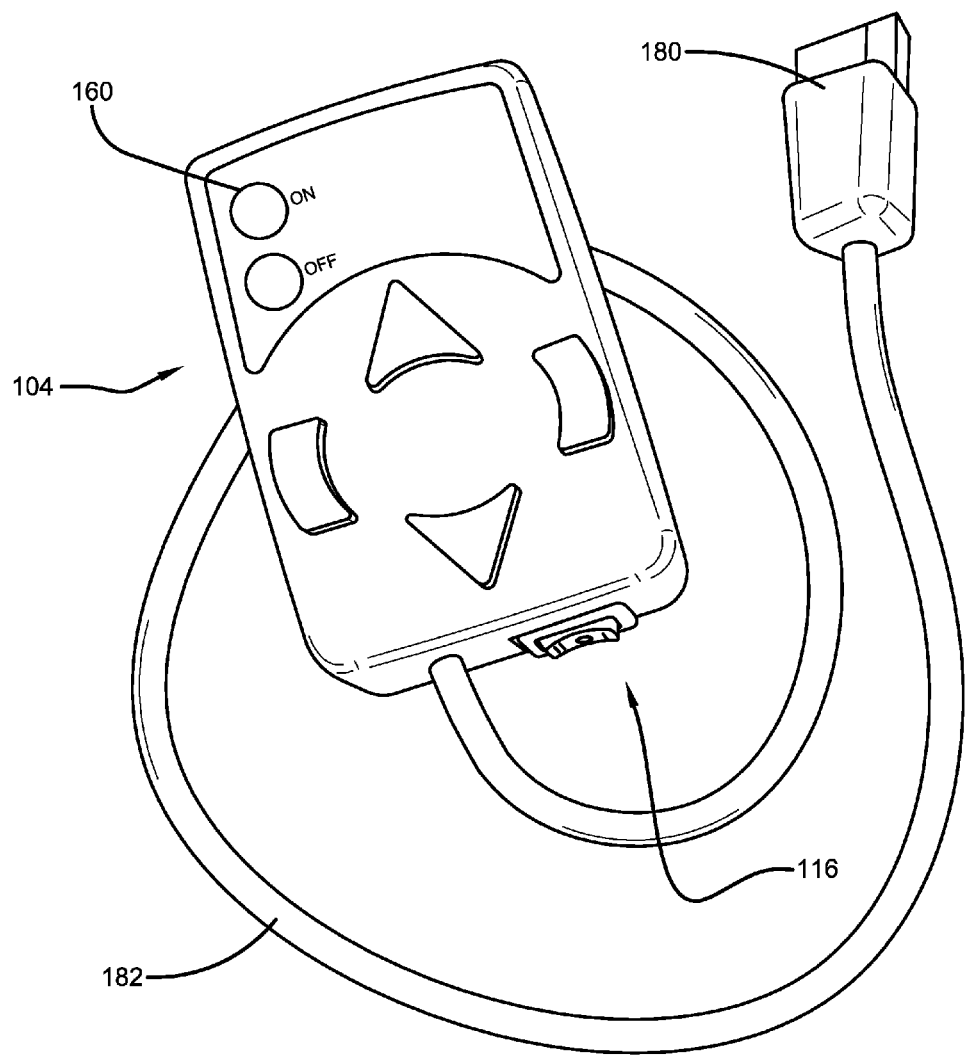
FIG. 18 is a view of the control housing shown in FIG. 16 but also showing an electrical connector.
Figure 19:
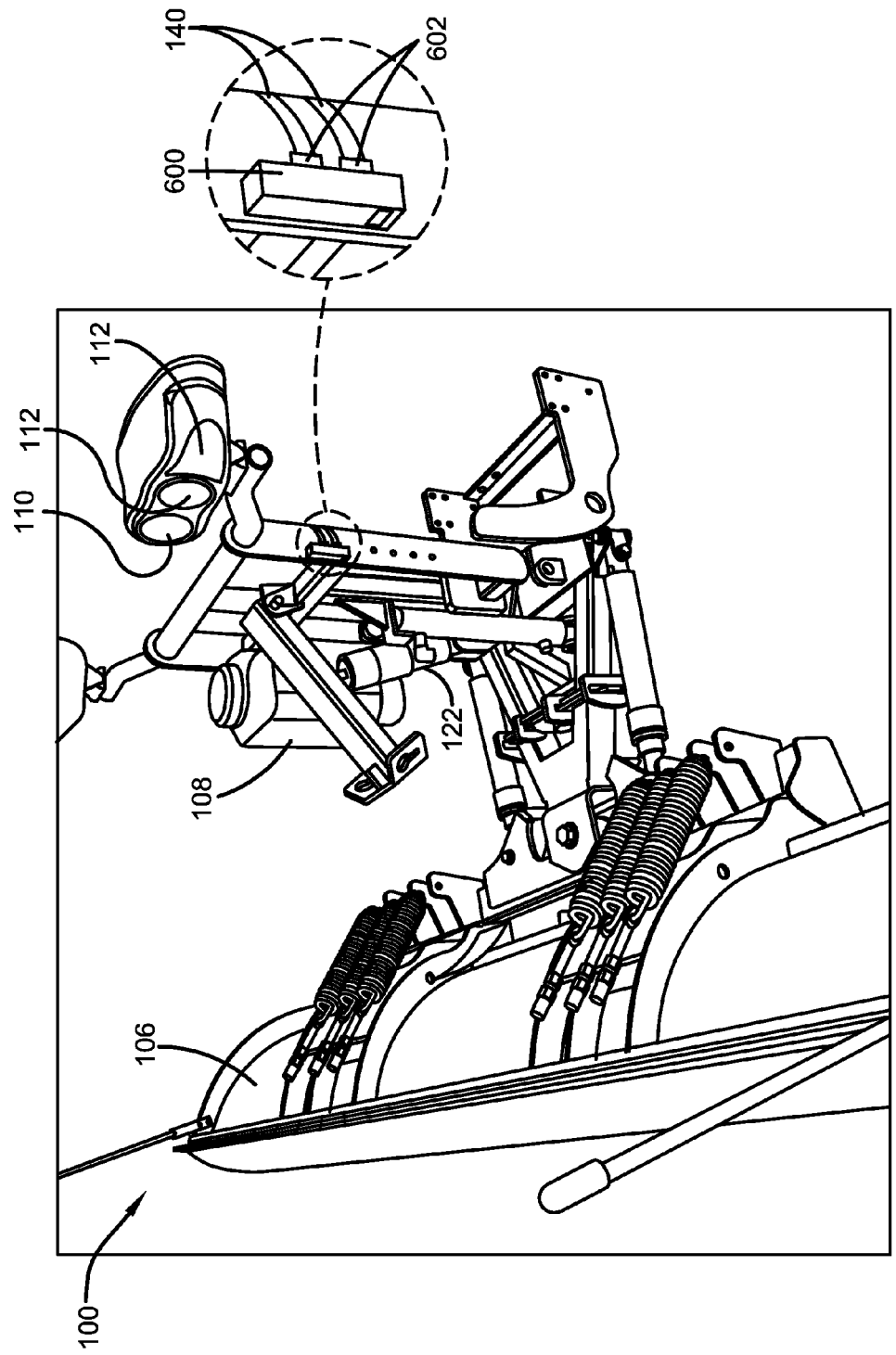
FIG. 19 is a perspective view of a plow frame with a controller.
Figure 20:
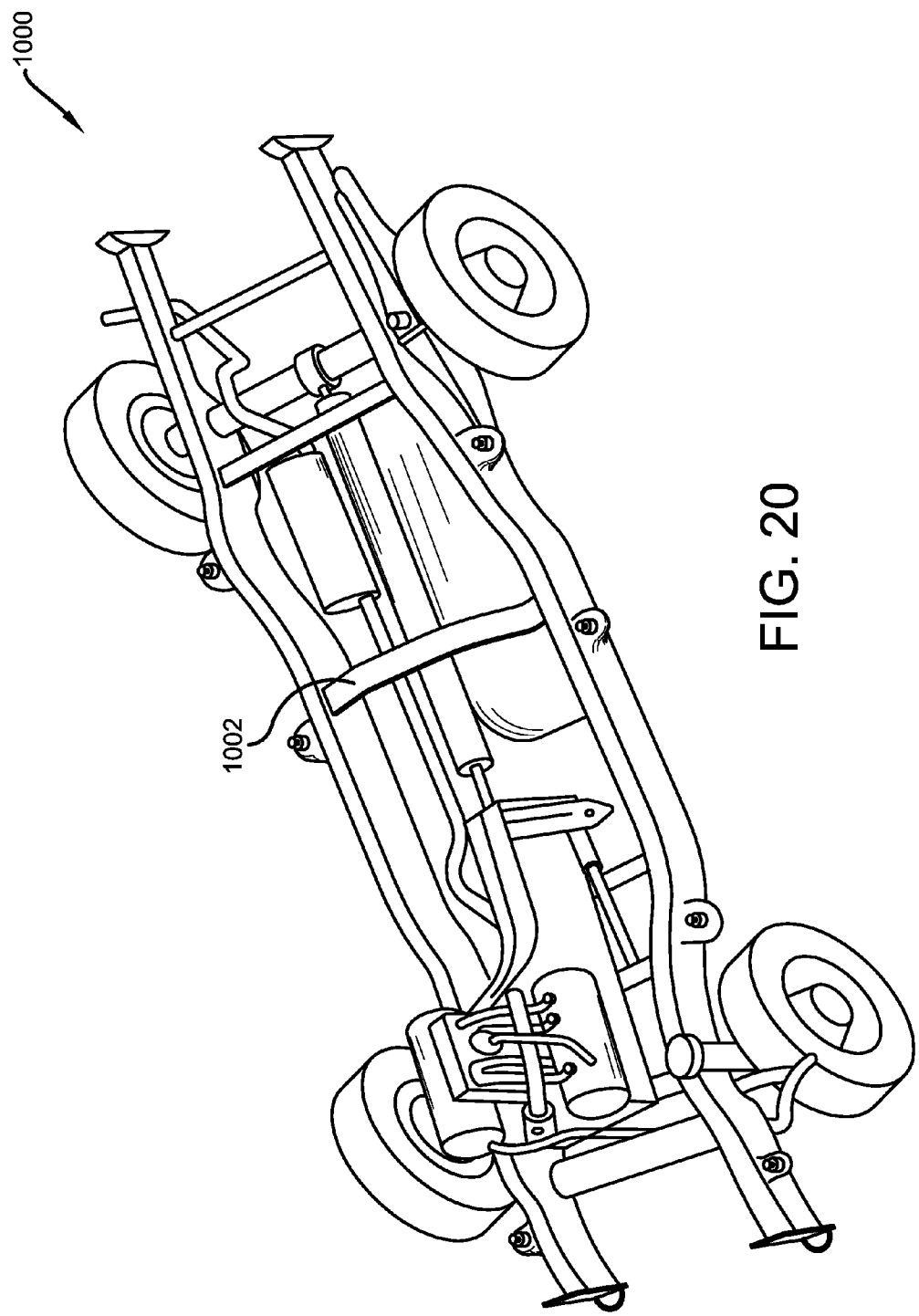
FIG. 20 is a perspective view of an embodiment of a vehicle chassis with the vehicle body removed.
Figure 21:
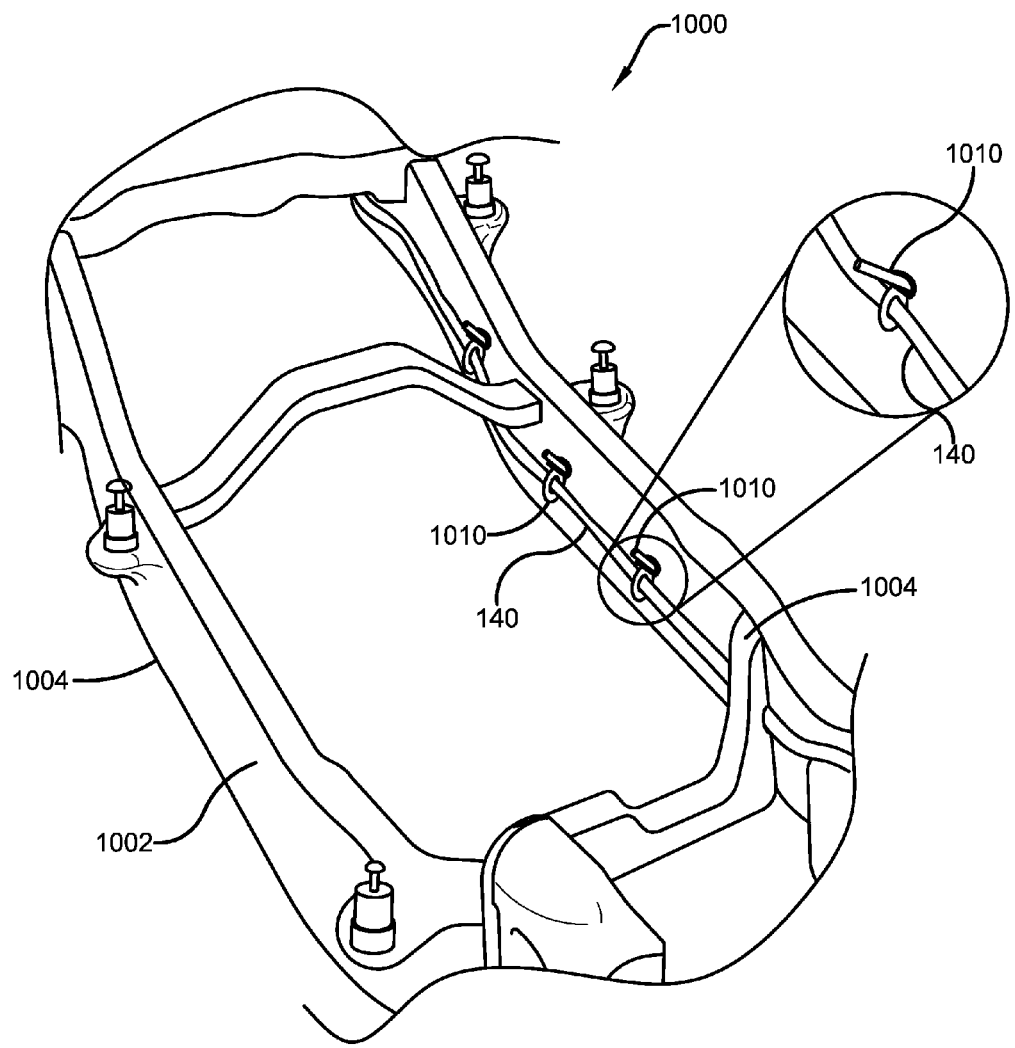
FIG. 21 is a detailed view of a portion of a vehicle chassis.
Figure 22:
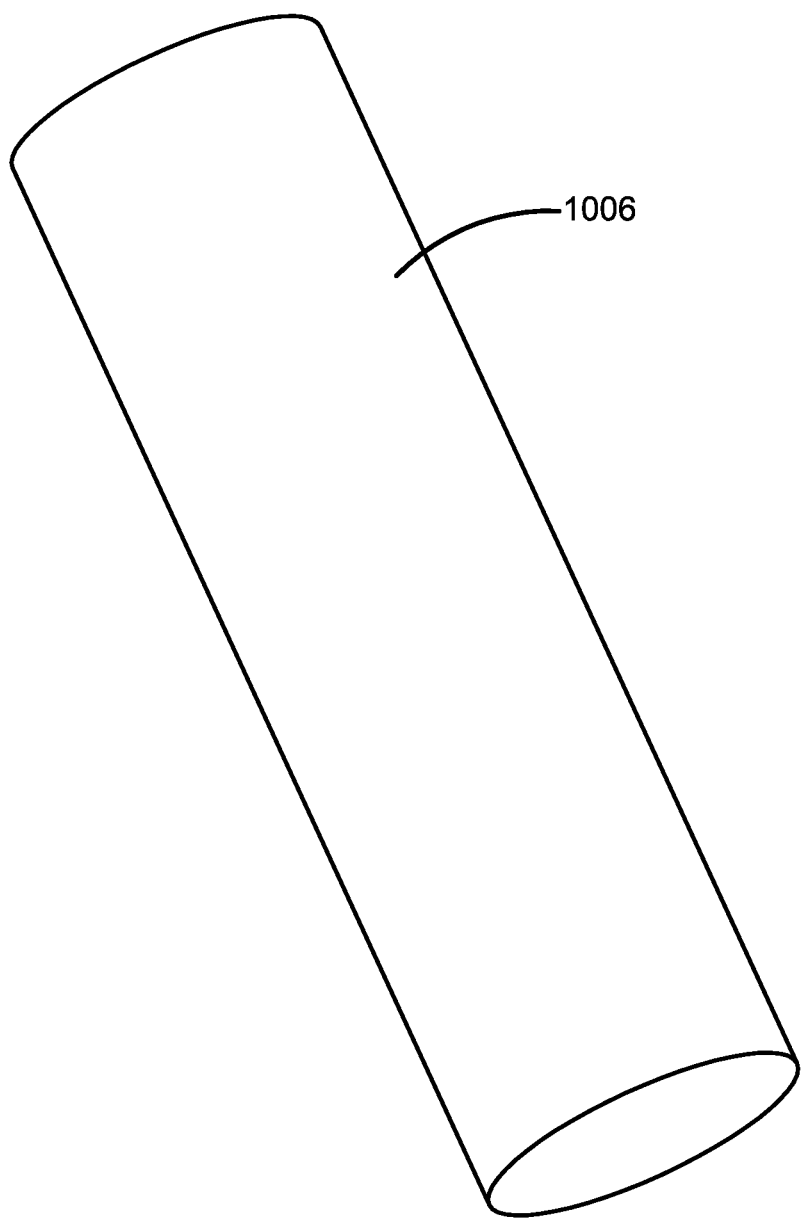
FIG. 22 illustrates a portion of a conduit that may be used to support auxiliary wiring according to some embodiments of this invention.
Figure 23:
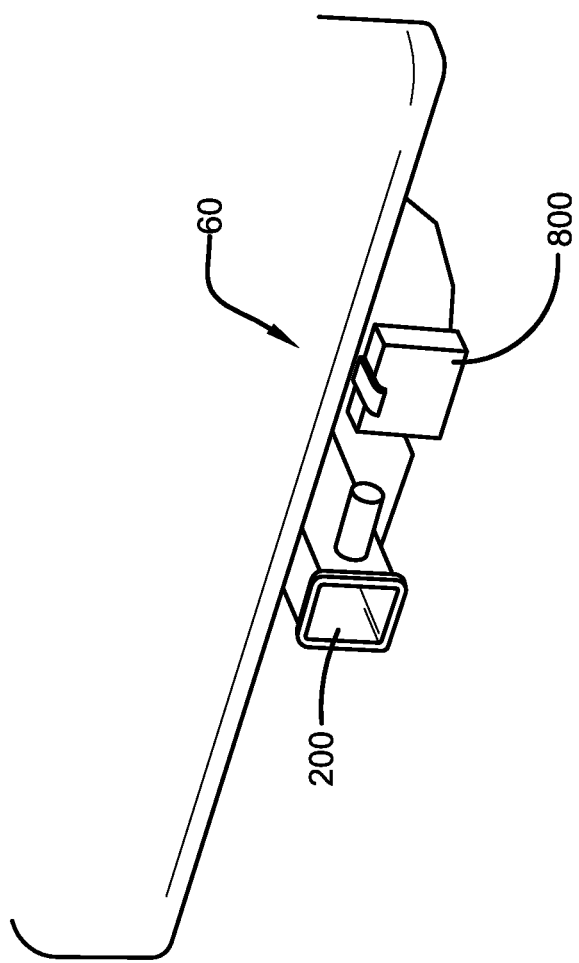
FIG. 23 is a perspective view of the rear of a vehicle, showing a transponder connected to a vehicle electric plug.
Figure 24:
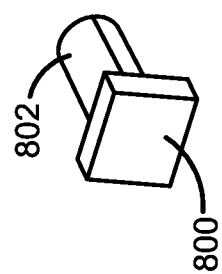
FIG. 24 is a perspective view of a transponder.
Figure 25:
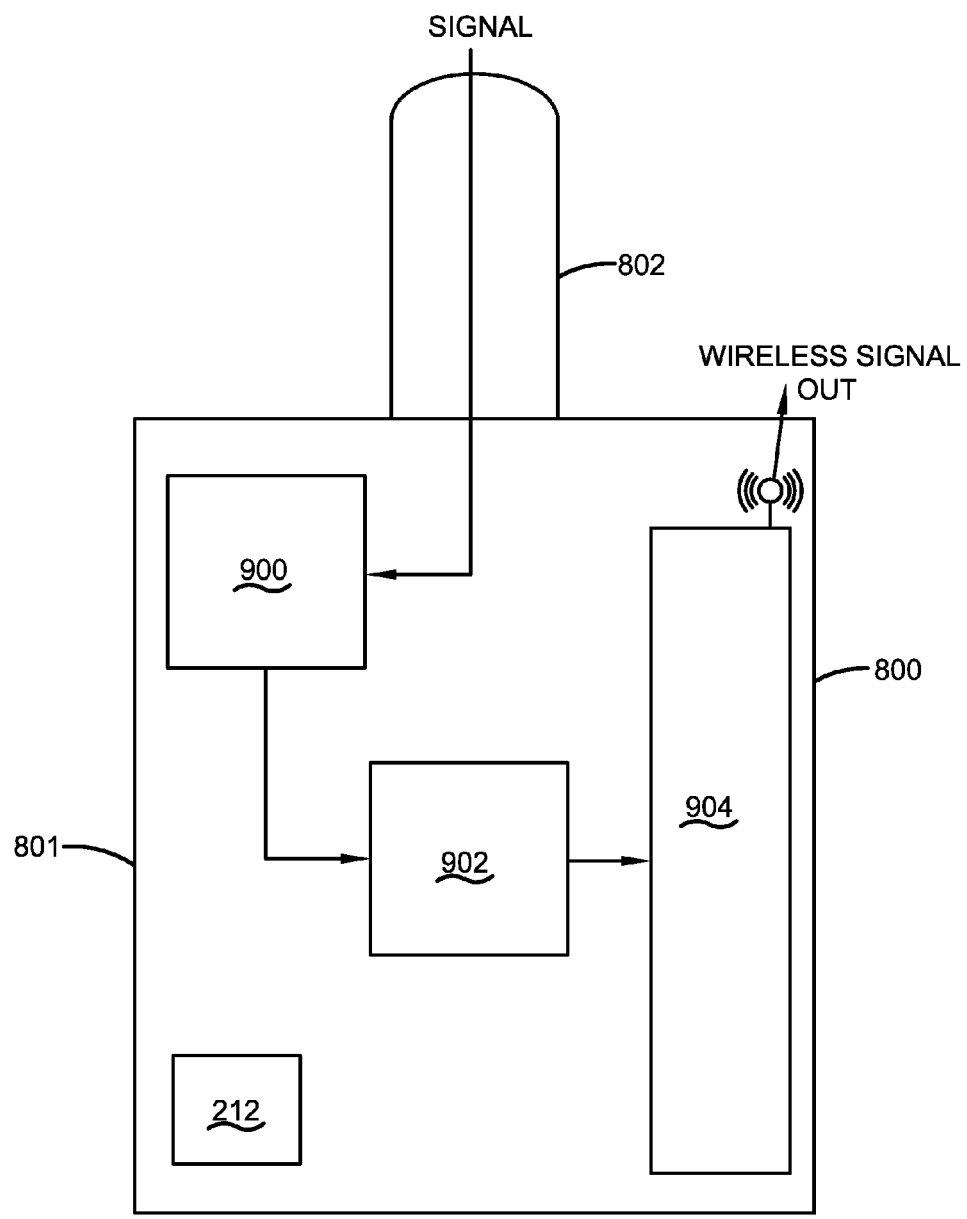
FIG. 25 is a schematic representation of a transponder.
Figure 26:
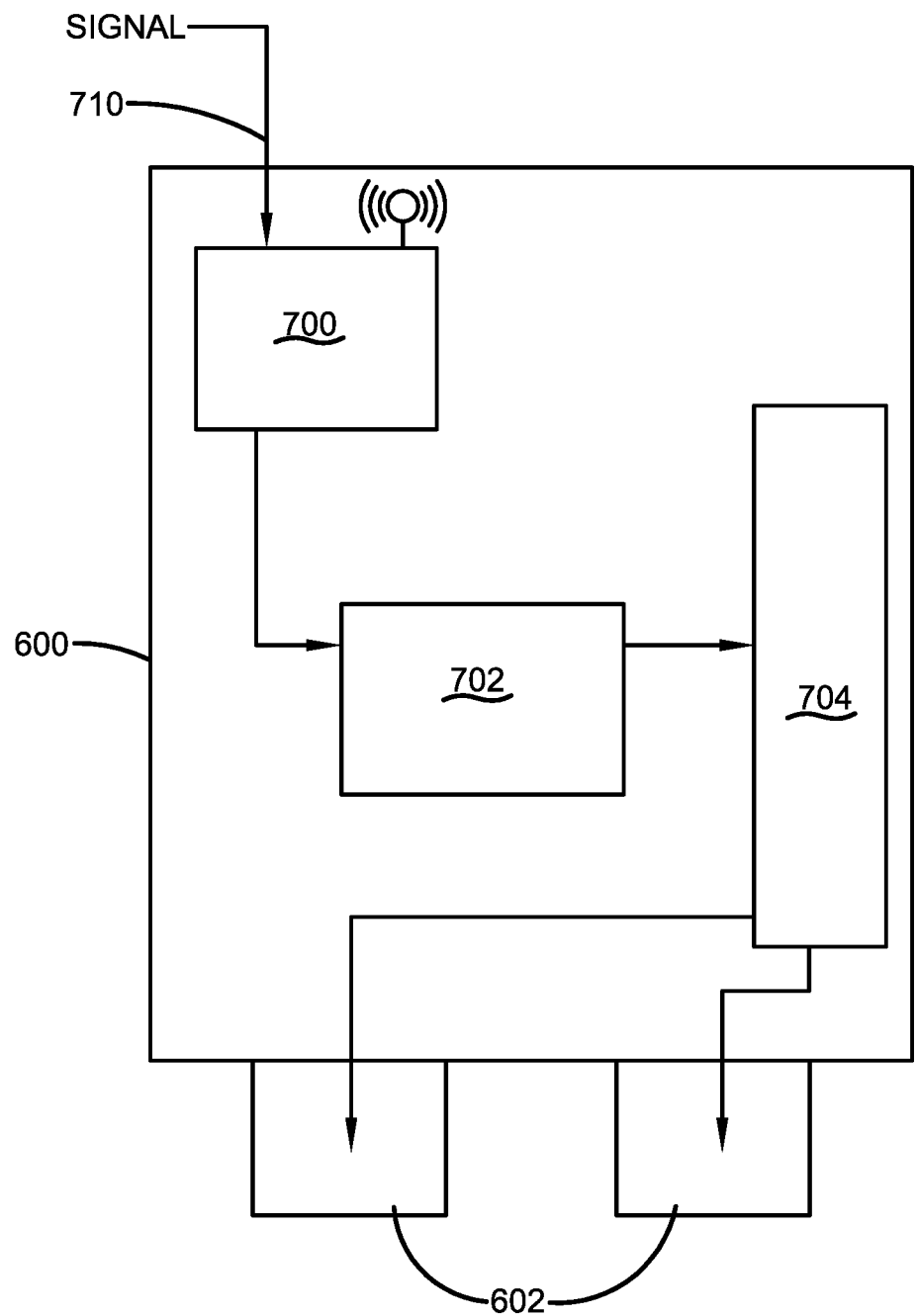
FIG. 26 is a schematic representation of a controller.

With reference to FIG. 12, an adapter 150 can be used between the vehicle electric plug 60 and the auxiliary wiring electrical connector plug. The adapter 150 can split the connections from the vehicle electric plug 60 into a first outlet 152 and a second outlet 154. The first and second outlets 152, 154 can be configured to allow connections for any of the various plug types. By way of a non-limiting example, the first outlet 152 can be a 7-way plug and the second outlet 154 can be a 5-way plug, as shown. The combinations can be chosen by a person of ordinary skill in the art and can be tailored for specific needs given the desired usage. The adapter 150 can allow a person to connect the present invention while leaving an additional connection available for use with a trailer or second implement. According to other embodiments, the adapter 150 can have more than two outlets.

With reference now to FIGS. 6, 11A, 11B and 13-15, the auxiliary wiring 140 may include one or more wiring harnesses. In one embodiment, the auxiliary wiring 140 includes three wiring harnesses as will now be described.

With reference now to FIGS. 5-7 and 13, the auxiliary wiring 140 may include a first wiring harness 416. Wiring harness 416 may include: a first electrical connector 418 that may be a power connector; a second electrical connector 420 that may be electrically connectable to at least one auxiliary headlight 110; a third electrical connector 422 that may be electrically connectable to at least one auxiliary supplemental light 112; a fourth electrical connector 424 that is electrically connectable to the auxiliary implement 100; and, a fifth electrical connector 426. It should be noted, however, that additional electrical connectors may also be part of the first wiring harness 416. Thus, for example, the first wiring harness 416 may also include a sixth electrical connector 428 that may be electrically connectable to at least one auxiliary headlight 110 and a seventh electrical connector 430 that may be electrically connectable to at least one auxiliary supplemental light 112. In one embodiment, the first wiring harness 416 includes an electrical connector for each of the auxiliary head lights and each of the auxiliary supplemental lights that must be illuminated. The first wiring harness 416 may also include additional electrical connectors 432 used to connect to various components of the auxiliary implement 100. Any number of electrical connectors chosen with the sound judgment of a person of skill in the art, may be included with the first wiring harness 416. If desired, a connector cap may be secured to the wiring harness 416 near any electrical connector that can use such a cap to protect the electrical connector when not in use. Electrical connector 418, for example, has a connector cap 434.

With reference now to FIGS. 5-7 and 14, the auxiliary wiring 140 may include a second wiring harness 440. Wiring harness 440 may include: a first end that is electrically connectable to the power source 13 (a pair of battery loops 442, one to receive the negative battery terminal and the other to receive the positive battery terminal, may be used for this purpose in one embodiment); and, a second end with a power connector 440. The power connector 440 may be electrically connectable to the power connector 418 of the first wiring harness 416 and may be designed to transmit power from the power source 13 to the power connector 418 of the first wiring harness to power the auxiliary implement 100. The power connector 440 may include an electrical connector cap 446, as shown.

With reference now to FIGS. 5-7, 11A, 11B and 15, the auxiliary wiring 140 may include a third wiring harness 450. Wiring harness 445 may include: a first electrical connector 452 that is electrically connectable to the vehicle electric plug 60 (such as previously described electrical connector plugs 140, 142 shown in FIGS. 11a and 11B, respectively); a second electrical connector 454 that is electrically connectable to the fifth electrical connector 426 of the first wiring harness 416; and, a third electrical connector 456 that is designed to be connected to the operator adjustable auxiliary light control 116 and the operator adjustable auxiliary implement control 104. The third wiring harness 450 may be designed to transmit an electrical signal from the vehicle electric plug 60 to the first wiring harness 416.

With reference now to FIGS. 5-9, 13-15 and 18, one or more of the electrical connectors described may, in some embodiments, be electric plugs. In some embodiments, shown, the following electric connectors are electric plugs: the power connector 418 of the first wiring harness 416; the second electrical connector 420 of the first wiring harness 416; the fifth electrical connector 426 of the first wiring harness 416; the sixth electrical connector 428 of the first wiring harness 416; the power connector 444 of the second wiring harness 440; the first electrical connector 452 of the third wiring harness 450; the second electrical connector 454 of the third wiring harness 450; and, the third electrical connector 456 of the third wiring harness 450.

With reference now to FIGS. 5-7 and 16, in one embodiment, not shown, the operator adjustable auxiliary implement control 104 and the operator adjustable auxiliary light control 116 user operable device 406 are supported within individual controller housings. In another embodiment, shown in FIGS. 6 and 16, the operator adjustable auxiliary implement control 104 and the operator adjustable auxiliary light control 116 are both supported to a common (the same) hand held controller housing 160. The controller housing(s) may be positioned in any location chosen with the sound judgement of a person of skill in the art. In one embodiment the controller housing(s) may be maintained within the vehicle so that the vehicle's driver can also operate the controls. The controller housing 160 may have a power ON/OFF switch 162 that is operable to place both the auxiliary headlight(s) 110 and the auxiliary supplemental light(s) 112 into unilluminated conditions when in the power OFF condition. The power ON/OFF switch 162 may also, or alternatively, be operable to turn OFF the operator adjustable auxiliary implement control 104 when in the OFF condition.

With reference now to FIGS. 5-7 and 16, as noted earlier the operator adjustable auxiliary implement control 104 may be operable to operate at least one function of the auxiliary implement 100 chosen with the sound judgment of a person of skill in the art. In one embodiment, the auxiliary implement 100 is a snowplow assembly, such as that shown in FIG. 7, and the operator adjustable auxiliary implement control 104 may have the capability to operate four functions related to the snowplow blade 106: a control button 164 that can be used to cause the snowplow blade 106 to angle toward the right; a control button 166 that can be used to cause the snowplow blade 106 to angle toward the left; a control button 168 that can be used to cause the snowplow blade 106 to be raised (such as to raise above the ground surface being plowed); and, a control button 170 that can be used to cause the snowplow blade 106 to be lowered (such as to lower onto the ground surface being plowed). As these operations are well known to those of skill in the art, further details will not be provided here.

With reference now to FIGS. 5-7 and 16-17, the operator adjustable auxiliary light control 116 may be operable to operate the auxiliary headlights 110 in any manner chosen with the sound judgment of a person of skill in the art. For the embodiment shown, the operator adjustable auxiliary light control 116 may comprise a control button 172 that is adjustable by the operator into three conditions: auxiliary headlights 110 powered OFF by pressing on portion 174 of the button 172; auxiliary headlights 110 in low beam condition by pressing on portion 176 of the button 172; and, auxiliary headlights 110 in high beam condition by pressing on portion 178 of the button 172. As these operations are well known to those of skill in the art, further details will not be provided here.

With reference now to FIGS. 6, 15-16 and 18, as noted earlier the auxiliary wiring 140 may connect to the operator adjustable auxiliary implement control 104 and to the operator adjustable auxiliary light control 116. This connection can be of any form chosen with the sound judgment of a person of skill in the art. In one embodiment, the third wiring harness 450 has a third electrical connector 456 that is designed to be connected to the operator adjustable auxiliary implement control 104 and to the operator adjustable auxiliary light control 116. In one specific embodiment, the third electrical connector 456 connects directly to the controller housing 160. In another specific embodiment, the third electrical connector 456 electrically connects to a controller electrical connector 180 which is hardwired 182 to the controller housing 160.

With reference now to FIGS. 5-7 and 19, as noted earlier the auxiliary wiring 140 may electrically connect to the auxiliary lighting system 102. In some embodiments this electrical connection is made by electrically connecting to (plugging into) a controller 600 which in some embodiments may include a microprocessor. Alternatively, this electrical connection is made by connection to another component(s) that connect to the controller 600. In yet other embodiments, a controller is not required in the connection is made directly to the auxiliary lighting system 102. The operation of the controller 600 will be discussed further below. In one embodiment, the controller 600 may have one or more ports 602 to which the auxiliary wiring 140 connects.

With reference now to FIGS. 5-7, 13-15 and 20-22, the auxiliary wiring 140, whether in the form of the three wiring harnesses 416, 440 and 450 discussed above or otherwise, may be secured to the auxiliary implement 100, and/or the auxiliary lighting system 100, and/or the vehicle, or any some combination in any manner chosen with the sound judgment of a person of skill in the art. According to one embodiment, at least a portion of the auxiliary wiring 140 is secured under the chassis 1000 of the vehicle and runs from the vehicle electric plug 60 to the auxiliary lighting system 102. If the vehicle electric plug 60 is a trailer plug (and thus positioned at the rear of the vehicle) then at least a portion of the auxiliary wiring 140 may run lengthwise from the rear of the vehicle to the auxiliary lighting system 102. According to another embodiment, the at least a portion of the auxiliary wiring 140 can terminate at the front of the vehicle whereby a second connection could be made with the auxiliary lighting system 102. In some embodiments the auxiliary wiring 140 can be secured to the chassis 1000, such as to the vehicle's frame rail 1004, using zip-ties 1100, twist ties, wires, or any other fastener chosen by the sound judgment of a person of ordinary skill in the art. The auxiliary wiring 140 may be shielded wire such as the hex-wire typically used for electronics. According to another embodiment some or all of the auxiliary wiring 140 can be routed through a conduit, such as conduit 1006 shown in FIG. 22. The conduit 1006 can be mounted to the chassis 1000, such as to the vehicle's frame rail 1004, using zip-ties 1010, automotive grade tape, or other fasteners. The conduit 1006 could be formed of any material chosen with the sound judgment of a person of skill in the art, such as polyvinyl chloride (PVC). According to another embodiment, the auxiliary wiring 140, whether in a conduit or otherwise, can be routed through the interior of the vehicle's frame 1002. In some embodiments, the auxiliary wiring 140 can be aligned to the driver side or passenger side of the vehicle. In one embodiment, the wiring is on the same side of the vehicle as the vehicle battery.

With reference now to FIG. 6, in some embodiments, a sensor 184 may be operable to turn off the auxiliary headlight(s) 110 and/or the auxiliary supplemental light(s) 112 when the vehicle lights are turned off. The operation of sensor 184 may be in any manner chosen with the sound judgment of a person of skill in the art. In one embodiment, the sensor 184 works with a microprocessor described elsewhere in this patent. In another embodiment the sensor 184 works with a relay in a known manner.

With reference now to FIGS. 5-7, 13-15, 19 and 26 in some embodiments the wiring harnesses 416, 440, 450 may be used as follows after the auxiliary implement 100 has been mounted to the vehicle and the auxiliary lighting system 102 has been mounted to the vehicle and/or to the implement 100. The wiring harnesses 416, 440, 450 may be secured as discussed above. The second electrical connector 420 of the first wiring harness 416 may be electrically connected to the auxiliary light(s) 104 (either directly or via a microprocessor). If the second electrical connector 420 is an electric plug, then it may plug into the auxiliary light(s). The third electrical connector 422 of the first wiring harness 416 may be electrically connected to the auxiliary implement 100. The first end of the second wiring harness 436 (using, in one embodiment, battery loops 438) may be electrically connected to the vehicle battery 12. The power connector 444 of the second wiring harness 440 may be electrically connected to the power connector 418 of the first wiring harness 416 to enable power to be transmitted from the vehicle battery 414 to the auxiliary snow and/or ice removal implement 100. If the power connectors 444, 418 are both electric plugs, then power connector 444 may be plugged into power connector 418 to establish the electrical connection.

With reference now to FIGS. 5-7, 13-15, and 19, the first electrical connector 452 of the third wiring harness 450 may be electrically connected to the vehicle electric plug 60 to enable an electric signal to be transmitted from the vehicle electric plug 60 to the first wiring harness 416. If the first electrical connector 452 is an electric plug, the electrical connector 452 may be plugged into the vehicle electric plug 60 to establish the electrical connection. The position of the vehicle electric plug 60 on the vehicle will determine the required length for the third wiring harness 450. The second electrical connector 454 of the third wiring harness 450 may be electrically connected to the fifth electrical connector 426 of the first wiring harness 416. If the electrical connectors 454, 426 are both electric plugs, then electrical connector 454 may be plugged into electrical connector 426 to establish the electrical connection. Once the wiring harnesses 416, 440 and 450 are properly connected, the operator adjustable auxiliary implement control 104 may be operable to operate at least one function of the auxiliary implement 100; the operator adjustable auxiliary light control 116 may be operable to operate the auxiliary light(s) 104; and, the operator adjustable vehicle light control 20 may be operable to operate the auxiliary headlight(s) 110. One or more of the controls 104, 116, 20 may be manually operable in some embodiments.

Figure 1:
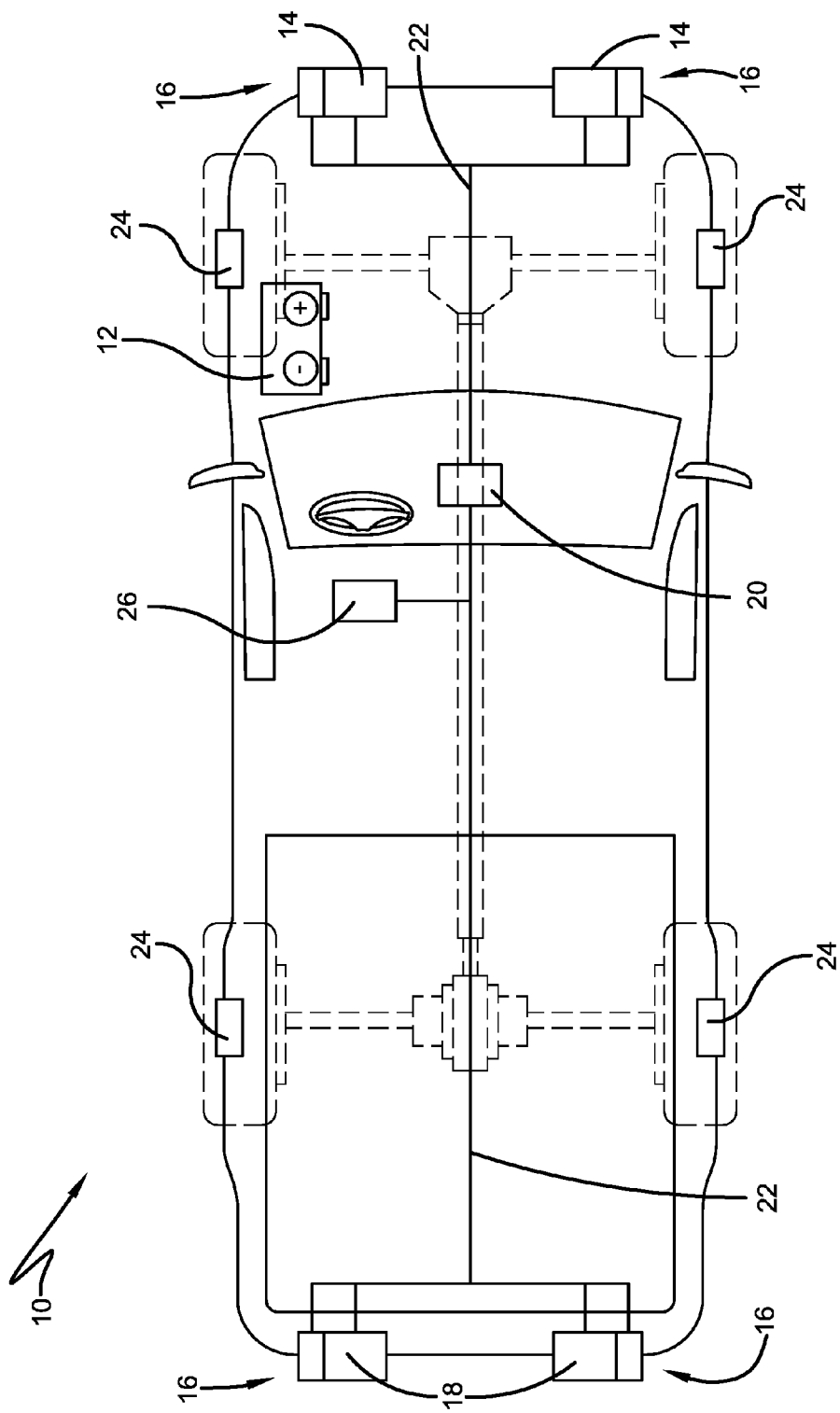
FIG. 1 is a top view of a known vehicle in schematic representation.
Figure 2:
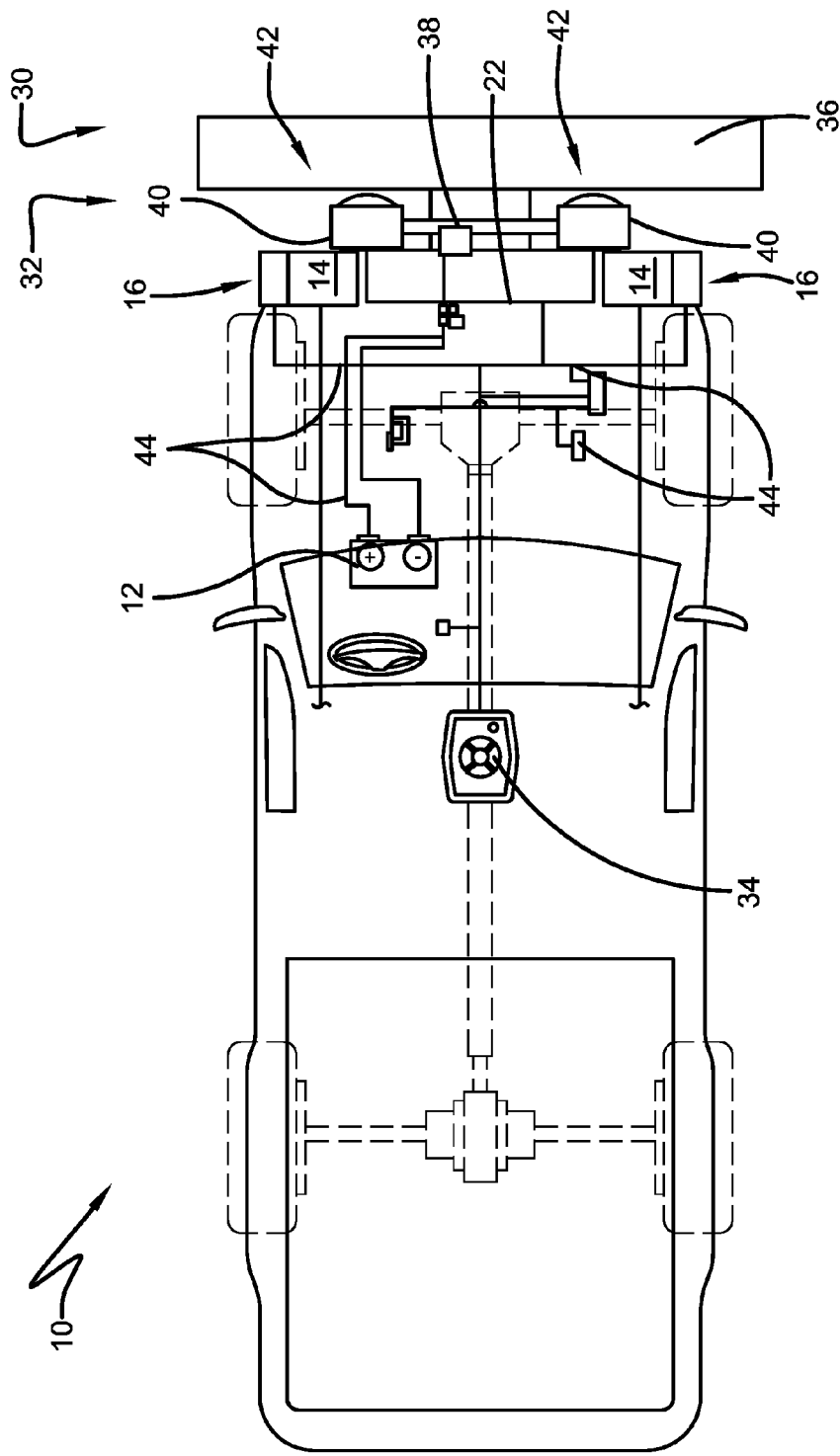
FIG. 2 is a top view of a known vehicle in schematic representation showing the complexity of known wiring systems required to install a snowplow.

There are numerous advantages of using such "hard-wired" devices and methods as compared to wireless devices and methods (discussed further below). These advantages include the lack of electrical interference and the lack of control delays both of which are often found in wireless systems. Another advantage is that all the steps are safely accomplished without the aid of an electrical technician. This is because no splicing or cutting of any wiring is required. Thus, none of the vehicle's electrical system, in function or in structure, is altered in any way. Thus, for example, with reference to FIGS. 1-2 and 6, the vehicle headlights 14 do not have to be detached and the auxiliary wiring 140 is not electrically connected to the vehicle light wiring 22, Also, there is no required reset or adjustments to the vehicle's computer. Another advantage, is that the various electrical plugs provide for easy "plug-and-play" connections. Thus, the time required to install this invention is greatly reduced over known systems. FIG. 6, especially when compared with FIG. 2, shows how greatly simplified the use of this invention is.

With reference now to FIGS. 5-7, 10A-10D, 13-15, 19 and 23-26, in other embodiments of this invention, instead of auxiliary wiring 140, a transponder 800 may be electrically connected to and physically supported to the vehicle electric plug 60. In one specific embodiment, the transponder 800 can include a transponder electrical connector plug 802 which plugs into the vehicle electric plug 60. The specific transponder electrical connector plug 802 used may be configured to connect to the particular vehicle electric plug 60 type mounted to the vehicle. According to one embodiment, the transponder plug 802 can be configured to align with a vehicle electric plug 60 such as the 7-way plug 300. According to other embodiments, the transponder plug 802 can be configured to connect to a vehicle electric plug 60 such as a 6-way plug 316, a 5-way plug 318, or a 4-way plug 320.

With continuing reference to FIGS. 5-7, 10A-10D, 13-15, 19 and 23-26 in some embodiments, the transponder 800 can include a housing 801 to which the transponder plug 802 is supported. The transponder 800 can also include several circuits that can perform one or more functions. The transponder 800 can, for example, include a receiving unit 900 which is supported to the housing 801 and which receives incoming signals from the vehicle via the vehicle electric plug 60. The receiver then directs the signal to the processing unit 902 which is also supported to the housing 801. The processing unit 902 can interpret the signal it receives to determine the appropriate signal it should send to the communication unit 904. The communication unit 904 may also be supported to the housing 801 and may transmit a corresponding wireless signal. The wireless signal can be radio frequency, WiFi, Bluetooth, or any other wireless transmission protocol capable of being broadcast over a wide enough distance to reliably reach the desired end point to control and/or power the auxiliary lighting system 102. In one embodiment, the transponder 800 can draw power directly from the vehicle's power supply 13 via the vehicle electric plug 60, such as auxiliary power connection 312 (shown in FIGS. 10A and 10B). In another embodiment, the transponder 800 may be powered directly by an independent power source 212 such as a battery which may be supported to the housing 801. According to an embodiment, the transponder 800 can be mounted to and supported by the hitch receiver 200. According to another embodiment, the transponder 800 can be mounted on and supported to the vehicle. In some embodiments the transponder 800 cannot transfer power to the auxiliary light system 114 so another source of power may need to be supplied to the auxiliary lighting system 102. In one embodiment, the auxiliary lighting system 102 is powered by the vehicle's power source 13. In this case, appropriate wiring will have to be provided between the vehicle power source 13 and the auxiliary lighting system 102. In another embodiment, the auxiliary lighting system 102 may be powered by a separate power source 450 shown in FIG. 5, which may be a battery, which is part of the auxiliary implement 100.

With reference now to FIGS. 5-7 and 23-26, the auxiliary lighting system 102 may include a controller 600 that uses a microprocessor. Controller 600 may, in one embodiment, be a controller that controls not only the auxiliary lighting system 102, but also one or more other portions of the auxiliary implement 100. In another embodiment, the controller 600 may control only the auxiliary lighting system 102. Controller 600 may be mounted on the auxiliary implement 100. According to alternative embodiments, the controller 600 can be mounted or on the vehicle, or within the engine compartment of the vehicle.

With continuing reference to FIGS. 5-7 and 23-26, the controller 600 may include several circuits that can perform one or more functions. The controller 600 may include a receiver 700 which receives incoming signals 710. In one embodiment, the signals 710 are sent by wires such as from the auxiliary wiring 140. In another embodiment, the incoming signals 710 are sent wirelessly (through radio frequency, WiFi, Bluetooth, or any other wireless transmission protocol) such as by the transponder 800. The receiver 700 then directs a corresponding signal to the microprocessor 702 which may be programmed to provide appropriate output(s) that may be directed to a power distribution circuit 704 which then sends the appropriate signals to the auxiliary lighting system 102. In one embodiment, the controller 600 may have one or more ports 602 as described above.

With reference now to FIGS. 5-7, 10A-10D, and 23-26, some non-limiting embodiments of how the microprocessor 702 may be programmed to be used with the auxiliary lighting system 102 will now be described. If the vehicle electric plug 60 includes a connection 308 for ground, this signal could be used for grounding purposes as is well known to those of skill in the art. The connections 302 and 304 for left and right turn signals can be used to control left and right turn signal lights on the auxiliary lighting system 102 similar to such lights that might be on a trailer and on the vehicle. If the vehicle electric plug 60 includes a connection 312 for auxiliary power, this connection could be used to power any component in any manner chosen by a person of skill in the art. Such a component may be an auxiliary lighting system 102 component and/or an auxiliary implement 100 component. Any vehicle electric plug connection that is not desired to be used can be repurposed or terminated, as determined by one of ordinary skill in the art. The connection 310 for trailer power brakes, for example, could be terminated.

With reference now to FIGS. 5-7 and 10A-10D, connections 302 and 304 can also be used for indicating that the vehicle operator has activated the vehicle brakes 24 as noted above. The connection 310 could also be used for this purpose. This braking signal could be used with the auxiliary lighting system 102 in a number of different ways. In one embodiment, one or more lights on the auxiliary lighting system 102 could be illuminated continuously for the duration of the braking event. In another embodiment, left and right turn signal lights on the auxiliary lighting system 102 could be controlled to flash on and off for the duration of the braking event. These embodiments may be used indicate to observers in front of the vehicle that the vehicle is slowing and/or that they should exercise caution. The brake signal could also, in some embodiments, be used with respect to the auxiliary implement 100. In one non-limiting example, the brake signal could be used to adjust the position of the snowplow assembly. The connection 314 for reverse lights could also be used to change the illumination (higher or lower level or illumination) of the auxiliary lighting system 102, such as one or more of the auxiliary supplemental lights 112, when the vehicle brakes 24 are operated. This then would provide a clear signal to those near the vehicle that the vehicle is being braked.

In alternate embodiments, the vehicle electric plug 60 can also be used to control auxiliary headlights 40 in any manner chosen with the sound judgment of a person of skill in the art. In one non-limiting example, it is common for vehicle light controls to be adjustable between: (1) an "off" or no power condition; (2) park or running lights "on" condition; (3) headlights "on" condition; and, (4) headlight high beams "on" condition. When the vehicle lights are in the off condition, no power goes to the vehicle head lights or high beams or to the vehicle's tail lights. In this case, connection 306 for tail lights would not be powered and the microprocessor 702 may be programmed to use this signal as an indication to provide no power to the auxiliary headlights—thus an "off" condition for the auxiliary headlights to match the vehicle headlights. When the vehicle lights are in any of the on conditions (whether park or running lights on, or headlights on, or high beams on), connection 306 for tail lights would be powered (an "on" condition) and the microprocessor 702 may be programmed to use this signal as an indication to provide power to the auxiliary headlights—thus an "on" condition for the auxiliary headlights. Whenever the auxiliary lighting system 102 is attached to the vehicle, the vehicle operator may treat all "headlight on" conditions (conditions 2, 3 and 4 discussed above) the same; namely, manually adjusting the vehicle light controls to be in the park or running lights "on" condition. In this way, neither the vehicle headlights nor the vehicle high beams will be "on" and thus will not reflect off of the auxiliary implement 100 back to the vehicle thereby interfering with the operator's vision.

In some embodiments a signal is communicated from the vehicle electric plug 60 through the auxiliary wiring 140 and eventually to the microprocessor 702. In other embodiments described above, a signal is communicated from the vehicle electric plug 60 through the transponder 800 then wirelessly from the transponder and eventually to the microprocessor 702. As is well known to those of skill in the art, a microprocessor operates based on the signal it receives from an input. As explained above, the signal that reaches the microprocessor 702 may come from a component intermediate the signal from the auxiliary wiring 140 or transponder 800—such as from the receiver 700. Additional and/or alternative intermediate components may also be used in other embodiments. For clarity, the expression "directly or indirectly" may be used in this patent with regard to signals (whether wired or wireless). It is to be understood that "directly" means a signal that travels directly from one component to a second component and indirectly" means a signal that travels from one component to a second component but with one or more intermediate components also used. Thus, for example, a signal that travels from auxiliary wiring 140 to microprocessor 702 with no intermediate components would be a direct signal. In this case, the microprocessor's operation may be said to be based directly on the signal. In another example, a signal that travels from the auxiliary wiring 140 to microprocessor 702 with one or more intermediate components (such as receiver 700) would be an indirect signal. In this case, the microprocessor's operation may be said to be based indirectly on the signal—regardless of what and how many intermediate components may be used. As another example, a wireless signal that travels from transponder 800 to microprocessor 702 with no intermediate components would be a direct signal. In this case, the microprocessor's operation may be said to be based directly on the wireless signal. In yet another example, a wireless signal that travels from transponder 800 to microprocessor 702 with one or more intermediate components (such as receiver 700) would be an indirect wireless signal. In this case, the microprocessor's operation may be said to be based indirectly on the wireless signal—regardless of what and how many intermediate components may be used.

To use this invention in some embodiments, the operator may first acquire the proper auxiliary wiring 140 to match the vehicle's electric plug 60 and the auxiliary lighting system 102 including, when used, the controller 600. The operator may then attach the auxiliary wiring 140 to the vehicle—embodiments of this attachment are described above. The operator may then electrically connect the auxiliary wiring 140, which may include the auxiliary plug 142, into the vehicle electric plug 60. The operator may then connect the auxiliary wiring 140 to the auxiliary lighting system 102. In some embodiments the auxiliary wiring 140 may be connected to the controller 600 or to another component which is ultimately connected to the controller 600. This may complete the attachment. In use, the operator may simply adjust the vehicle lights, typically using vehicle light controls within the vehicle, to match the atmospheric light condition. If the atmospheric light condition is relatively lighter, there may be no need to turn on the vehicle lights. As a result, the vehicle electric plug 60 may indicate that no tail lights are required. The microprocessor 702 may use that indication to keep the auxiliary headlight(s) in an off condition. If the atmospheric light condition is relatively darker, there may be a need for the operator to turn on the vehicle lights. As a result of the operator turning on the vehicle lights, the vehicle electric plug 60 may indicate that tail lights are required. The microprocessor 702 may use that indication to place the auxiliary headlight(s) in an on condition. Turn signals, if applicable, may be used as described above. Similarly, a brake signal, if applicable, may be used as described above.

To use this invention in some embodiments, the operator may first acquire the proper transponder 800 to match the vehicle's electric plug 60 and the auxiliary lighting system 102 including, when applicable, the controller 600. The operator may then attach the transponder 800 to the vehicle—embodiments of this attachment are described above. The operator may then electrically connect the transponder 800 to the vehicle electric plug 60. Embodiments for this connection are described above. This may complete the attachment. In use, the operator may simply adjust the vehicle lights, typically using vehicle light controls within the vehicle, to match the atmospheric light condition. If the atmospheric light condition is relatively lighter, there may be no need to turn on the vehicle lights. As a result, the vehicle electric plug 60 may indicate that no tail lights are required. The microprocessor 702 may use that indication to keep the auxiliary headlight(s) in an off condition. If the atmospheric light condition is relatively darker, there may be a need for the operator to turn on the vehicle lights. As a result of the operator turning on the vehicle lights, the trailer plug 202 may indicate that tail lights are required. The microprocessor 702 may use that indication to place the auxiliary headlight(s) in an on condition. Turn signals, if applicable, may be used as described above. Similarly, a brake signal, if applicable, may be used as described above.

To use this invention in some embodiments, the operator may first acquire the proper auxiliary wiring 140 to match the vehicle's electric plug 60 and the auxiliary lighting system 102. The operator may then attach the auxiliary wiring 140 to the vehicle—embodiments of this attachment are described above. The operator may then electrically connect the auxiliary wiring 140 to the vehicle electric plug 60, to the power source 13, to the auxiliary implement 100, to the auxiliary lighting system 102, to the operator adjustable auxiliary implement control 104 and to the operator adjustable auxiliary light control 116. This may complete the attachment. As explained above, these electrical connections may be simple "plug in" attachments. In use, the operator may simply adjust the operator adjustable vehicle light control 20 to operate the auxiliary supplemental lights 112, auxiliary turn signal lights and/or auxiliary park lights for example, based directly or indirectly on the electrical signal transmitted from the vehicle electric plug 60. The operator may also simply adjust the operator adjustable auxiliary light control 116 to operate the auxiliary headlights 110 to illuminate the ground surface upon which the vehicle travels in place of the vehicle headlights 14. Finally, the operator may simply adjust the operator adjustable auxiliary implement control 104 to operate at least one function of the auxiliary implement 100—for example, to raise or lower a snowplow blade 106.

As described above, the present disclosure has been described with preferred embodiments thereof and it is understood that many changes and modifications to the described embodiments can be carried out without departing from the scope and the spirit of the present disclosure that is intended to be limited only by the appended claims.

Having thus described the invention, it is now claimed:

1. An auxiliary apparatus for use with an associated vehicle having: exterior vehicle lights that include at least one vehicle headlight that illuminates a ground surface in front of the associated vehicle upon which the associated vehicle travels and at least one vehicle supplemental light that is at least one of a turn signal light and a park light; an operator adjustable vehicle light control with which a user can control the exterior vehicle lights; a power source; and, a vehicle electric plug that indicates the condition of the vehicle supplemental light; the auxiliary apparatus comprising:

an auxiliary implement that: (1) comprises an operator adjustable auxiliary implement control; and, (2) is removably mountable to the associated vehicle;

an auxiliary lighting system that: (1) is designed for use with the auxiliary implement; (2) comprises at least one auxiliary headlight designed to illuminate the ground surface upon which the associated vehicle travels in place of the vehicle headlight; (3) comprises at least one auxiliary supplemental light that is at least one of a turn signal light and a park light; and, (4) comprises an operator adjustable auxiliary light control;

auxiliary wiring that is designed to: (1) electrically hardwire connect the power source to: the auxiliary implement; and, the auxiliary lighting system; (2) transfer power from the power source to: the auxiliary implement; and, the auxiliary lighting system; (3) electrically hardwire connect the vehicle electric plug to the auxiliary lighting system; and, (4) transmit an electrical signal from the vehicle electric plug to the auxiliary lighting system; and, wherein when the auxiliary wiring is properly connected: (1) the operator adjustable auxiliary implement control is operable to operate at least one function of the auxiliary implement; (2) the operator adjustable auxiliary light control is operable to operate the at least one auxiliary headlight; and, (3) the operator adjustable vehicle light control is operable to operate the at least one auxiliary supplemental light.

2. The auxiliary apparatus of claim 1 wherein:
the associated vehicle has vehicle light wiring that electrically connects the operator adjustable vehicle light control to the at least one vehicle headlight; and,
when the auxiliary wiring is properly connected, the auxiliary wiring is not electrically connected to the vehicle light wiring.

3. The auxiliary apparatus of claim 1 wherein:
the operator adjustable auxiliary light control and the operator adjustable auxiliary implement control are both supported to a common controller housing.

4. The auxiliary apparatus of claim 3 wherein:
the controller housing comprises a power ON/OFF switch that puts both the at least one auxiliary headlight and the at least one auxiliary supplemental light into unilluminated conditions when in the power OFF condition.

5. The auxiliary apparatus of claim 1 wherein the auxiliary wiring comprises:
a first wiring harness that: (1) has a first electrical connector that is a power connector; (2) has a second electrical connector that is electrically connectable to the at least one auxiliary headlight; (3) has a third electrical connector that is electrically connectable to the at least one auxiliary supplemental light; (4) has a fourth electrical connector that is electrically connectable to the auxiliary implement; and, (5) has a fifth electrical connector;
a second wiring harness that: (1) has a first end that is electrically connectable to the power source; (2) has a second end with a power connector that is electrically connectable to the power connector of the first wiring harness; and, (3) is designed to transmit power from the power source to the power connector of the first wiring harness; and,
a third wiring harness that: (1) has a first electrical connector that is electrically connectable to the vehicle electric plug; (2) has a second electrical connector that is electrically connectable to the fifth electrical connector of the first wiring harness; (3) has a third electrical connector that is designed to be connected to the operator adjustable auxiliary light control and the operator adjustable auxiliary implement control; and, (4) is designed to transmit an electrical signal from the vehicle electric plug to the first wiring harness.

6. The auxiliary apparatus of claim 5 wherein:
the power connector of the first wiring harness is an electric plug;
the fifth electrical connector of the first wiring harness is an electric plug;
the power connector of the second wiring harness is an electric plug;
the first electrical connector of the third wiring harness is an electric plug;
the second electrical connector of the third wiring harness is an electric plug;
the third electrical connector of the third wiring harness is an electric plug;
the power connector of the first wiring harness is designed to be plugged into the power connector of the second wiring harness;
the fifth electrical connector of the first wiring harness is designed to be plugged into the second electrical connector of the third wiring harness;
the first electrical connector of the third wiring harness is designed to be plugged into the vehicle electric plug; and,
the third electrical connector of the third wiring harness is designed to be plugged into an electric plug that electrically connects the third electrical connector of the third wiring harness to the operator adjustable auxiliary light control and the operator adjustable auxiliary implement control.

7. The auxiliary apparatus of claim 1 wherein:
the associated vehicle has a brake that is operable to slow down the associated vehicle's speed; and,
the at least one auxiliary supplemental light has a higher level of illumination when the brake is operated than when the brake is not operated.

8. The auxiliary apparatus of claim 1 wherein:
the associated vehicle comprises at least two vehicle supplemental lights including a turn signal light and a park light;
the auxiliary lighting system comprises at least two auxiliary supplemental lights including a turn signal light and a park light; and,
when the auxiliary wiring is properly connected: the operator adjustable vehicle light control is operable to control the auxiliary turn signal light and the auxiliary park light.

9. The auxiliary apparatus of claim 1 wherein:
the auxiliary implement is an auxiliary snow and/or ice removal implement.

10. The auxiliary apparatus of claim 1 wherein:
the vehicle electric plug is positioned on a rear end of the associated vehicle; and,
when the auxiliary wiring is properly connected: at least a portion of the auxiliary wiring that connects the vehicle electric plug to the auxiliary lighting system is supported to the associated vehicle and extends from the rear end of the associated vehicle toward a front end of the associated vehicle.

11. A method of using an auxiliary lighting system with an associated vehicle having: exterior vehicle lights that include at least one vehicle headlight that illuminates a ground surface in front of the associated vehicle upon which the associated vehicle travels and at least one vehicle supplemental light that is at least one of a turn signal light and a park light; an operator adjustable vehicle light control with which a user can control the exterior vehicle lights; a power source; and, a vehicle electric plug that indicates the condition of the vehicle supplemental light; the method comprising the steps of:

(A) providing an auxiliary implement comprising an operator adjustable auxiliary implement control;

(B) providing an auxiliary lighting system that: (1) is designed for use with the auxiliary implement; (2) comprises at least one auxiliary headlight; (3) comprises at least one auxiliary supplemental light that is at least one of a turn signal light and a park light; and, (4) comprises an operator adjustable auxiliary light control;

(C) providing auxiliary wiring;

(D) designing the auxiliary implement, the auxiliary lighting system, and the auxiliary wiring to be operable according to the following steps:

(1) mounting the auxiliary implement to the associated vehicle;

(2) mounting the auxiliary lighting system to at least one of the associated vehicle and the auxiliary implement;

(3) electrically hardwire connecting the auxiliary wiring to electrically hardwire connect the power source to: the auxiliary implement and the auxiliary lighting system;

(4) electrically hardwire connecting the auxiliary wiring to electrically hardwire connect the vehicle electric plug to the auxiliary lighting system;

(5) transferring power from the power source to: the auxiliary implement and the auxiliary lighting system;

(6) transmitting an electrical signal from the vehicle electric plug to the auxiliary lighting system;

(7) using the operator adjustable vehicle light control to operate the at least one auxiliary supplemental light based directly or indirectly on the electrical signal;

(8) using the operator adjustable auxiliary light control to operate the at least one auxiliary headlight to illuminate the ground surface upon which the associated vehicle travels in place of the vehicle headlight; and, (9) using the operator adjustable auxiliary implement control to operate at least one function of the auxiliary implement.

12. The method of claim 11 wherein:
the associated vehicle has vehicle light wiring that electrically connects the operator adjustable vehicle light control to the at least one vehicle headlight; and,
when the auxiliary wiring is properly connected, the auxiliary wiring is not electrically connected to the vehicle light wiring.

13. The method of claim 11 wherein:
steps (A) and (B) comprise the steps of: providing the operator adjustable auxiliary light control and the operator adjustable auxiliary implement control to both be supported to a common controller housing; and, providing the controller housing with a power ON/OFF switch; and,
the method further comprises the step of: placing the ON/OFF switch into an OFF condition thereby causing both the at least one auxiliary headlight and the at least one auxiliary supplemental light into unilluminated conditions.

14. The method of claim 11 wherein:
the associated vehicle has a brake that is operable to slow down the associated vehicle's speed; and,
the method further comprises the step of: operating the brake thereby causing the at least one auxiliary supplemental light to have a higher level of illumination than when the brake is not operated.

15. The method of claim 11 wherein:
the associated vehicle comprises at least two vehicle supplemental lights including a turn signal light and a park light;
step (B) comprises the step of: providing the auxiliary lighting system to comprise at least two auxiliary supplemental lights including a turn signal light and a park light; and,
step (D)(7) comprises the steps of: using the operator adjustable vehicle light control to operate the auxiliary turn signal light; and, using the operator adjustable vehicle light control to operate the auxiliary park light.

16. The method of claim 11 wherein:
the vehicle electric plug is positioned on a rear end of the associated vehicle; and,
step (D)(4) comprises the steps of: supporting at least a portion of the auxiliary wiring to the associated vehicle; and, extending the at least a portion of the auxiliary wiring toward a front end of the associated vehicle.

17. An apparatus comprising:
a vehicle comprising: (1) exterior vehicle lights that include at least one vehicle headlight that illuminates a ground surface in front of the vehicle upon which the vehicle travels; and, at least one vehicle supplemental light that is at least one of a turn signal light and a park light; (2) an operator adjustable vehicle light control with which a user can control the exterior vehicle lights; (3) a power source; and, (4) a vehicle electric plug that indicates the condition of the vehicle supplemental light;

an auxiliary implement that: (1) comprises an operator adjustable auxiliary implement control; and, (2) is removably mountable to the vehicle;

an auxiliary lighting system that: (1) is designed for use with the auxiliary implement; (2) comprises at least one auxiliary headlight designed to illuminate the ground surface upon which the vehicle travels in place of the vehicle headlight; (3) comprises at least one auxiliary supplemental light that is at least one of a turn signal light and a park light; and, (4) comprises an operator adjustable auxiliary light control;

auxiliary wiring that is designed to: (1) electrically hardwire connect the power source to: the auxiliary implement; and, the auxiliary lighting system; (2) transfer power from the power source to: the auxiliary implement; and, the auxiliary lighting system; (3) electrically hardwire connect the vehicle electric plug to the auxiliary lighting system; and, (4) transmit an electrical signal from the vehicle electric plug to the auxiliary lighting system; and, wherein when the auxiliary wiring is properly connected: (1) the operator adjustable auxiliary implement control is operable to operate at least one function of the auxiliary implement; (2) the operator adjustable auxiliary light control is operable to operate the at least one auxiliary headlight; and, (3) the operator adjustable vehicle light control is operable to operate the at least one auxiliary supplemental light.

18. The apparatus of claim 17 wherein:

the vehicle electric plug is positioned on a rear end of the vehicle; and, when the auxiliary wiring is properly connected: at least a portion of the auxiliary wiring that connects the vehicle electric plug to the auxiliary lighting system is supported to the vehicle and extends from the rear end of the vehicle toward a front end of the vehicle.

19. The apparatus of claim 17 wherein:

the vehicle comprises vehicle light wiring that electrically connects the operator adjustable vehicle light control to the at least one vehicle headlight; and, when the auxiliary wiring is properly connected, the auxiliary wiring is not electrically connected to the vehicle light wiring.

20. The apparatus of claim 17 wherein:

the vehicle comprises a brake that is operable to slow down the vehicle's speed; and, the at least one auxiliary supplemental light has a higher level of illumination when the brake is operated than when the brake is not operated.

* * * * *